US006223247B1

(12) United States Patent
Otsuka et al.

(10) Patent No.: US 6,223,247 B1
(45) Date of Patent: Apr. 24, 2001

(54) DISK SHAPED RECORDING MEDIUM AND DRIVE APPARATUS UTILIZING LOGICAL BLOCK ADDRESS CONVERSION AND START ADDRESSES WHICH INCREASE FROM INNER AND OUTER CIRCUMFERENTIAL SIDES OF THE MEDIUM

(75) Inventors: Satoshi Otsuka; Yoshikatsu Niwa, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/750,223

(22) PCT Filed: Mar. 29, 1996

(86) PCT No.: PCT/JP96/00870

§ 371 Date: Nov. 26, 1996

§ 102(e) Date: Nov. 26, 1996

(87) PCT Pub. No.: WO96/30907

PCT Pub. Date: Oct. 3, 1996

(30) Foreign Application Priority Data

Mar. 30, 1995 (JP) .................................................. 7-073697

(51) Int. Cl.[7] ............................ G06F 12/02; G06F 11/20; G11B 27/00
(52) U.S. Cl. .............................. 711/4; 711/202; 711/209; 711/112; 369/275.3; 714/8
(58) Field of Search .................................. 711/4, 202, 203, 711/209, 111, 112, 114; 395/182.03, 182.06, 183.18; 369/54, 58, 48, 275.3; 714/6, 8

(56) References Cited

U.S. PATENT DOCUMENTS

| | | | |
|---|---|---|---|
| 4,558,176 | 12/1985 | Arnold et al. ........................ | 713/190 |
| 4,975,898 | 12/1990 | Yoshida ................................ | 369/100 |
| 5,182,770 | 1/1993 | Medveczky et al. .................. | 705/56 |
| 5,295,126 | 3/1994 | Okano et al. .......................... | 369/47 |
| 5,319,627 | * 6/1994 | Shinno et al. ......................... | 369/54 |
| 5,363,352 | * 11/1994 | Tobita et al. .......................... | 369/13 |
| 5,436,770 | * 7/1995 | Muto et al. ............................ | 369/59 |
| 5,461,220 | 10/1995 | Ogino .................................. | 235/454 |
| 5,541,903 | * 7/1996 | Funahashi et al. .................... | 369/54 |
| 5,592,452 | * 1/1997 | Yoshimoto et al. ................... | 369/54 |
| 5,687,397 | * 11/1997 | Ohmori ................................. | 369/48 |
| 5,761,301 | 6/1998 | Oshima et al. ........................ | 705/57 |
| 5,805,551 | 9/1998 | Oshima et al. ........................ | 369/59 |

FOREIGN PATENT DOCUMENTS

| | | |
|---|---|---|
| 0 632 397 A2 | 1/1995 | (EP) . |
| 0 898 278 A2 | 2/1999 | (EP) . |
| 63-20769 | * 1/1988 | (JP) . |
| 63-261578 | 10/1988 | (JP) . |
| 64-14776 | 1/1989 | (JP) . |
| 3-256225 | 11/1991 | (JP) . |
| 6-314174 | 11/1994 | (JP) . |
| 6-332762 | 12/1994 | (JP) . |
| 7-57263 | 3/1995 | (JP) . |
| 7-64841 | 3/1995 | (JP) . |

\* cited by examiner

*Primary Examiner*—Glenn Gossage
(74) *Attorney, Agent, or Firm*—Limbach & Limbach L.L.P.

(57) ABSTRACT

A disk shaped recording medium, drive apparatus and method for driving a medium divided into at least a recordable area and a reproduction only area, are disclosed. Address conversion is carried out by a conversion table so that the leading portion of a logical block address (LBA) when an optical disc is viewed from the host computer side is caused to correspond to the leading physical block address PBA1=RAM_START of a random access memory (RAM) area of the outermost circumferential side of the optical disc. Thus, reproduction can be started from the leading portion of a RAM area disposed at the innermost circumferential side. Even if a read only memory (ROM) area is disposed at the outermost circumferential side, this optical disc can be used as boot device. In addition, since the ROM area can be disposed at the outermost circumferential side, data transfer speed of the ROM area is permitted to be high data transfer speed in an optical disc employing a zone constant angular velocity (CAV) system.

19 Claims, 45 Drawing Sheets

FIG.10

| ZONE | OUTER RADIUS (μm) | TRACKS | CLOCK | SECTOR | BYTE/ SEG | SEG/ SECTOR | MIN DENSITY | CAP (MB) |
|---|---|---|---|---|---|---|---|---|
| GCP | 42100 | 736 | 24 | | | | | 0.078 |
| BUFFER TRACKS | 41216.8 | 2 | 48 | 40 | 46 | 65 | 0.42817 | 0.195 |
| CONTROL TRACKS | 41214.4 | 5 | 48 | 100 | 46 | 65 | 0.42811 | 0.078 |
| BUFFER TRACKS | 41208.4 | 2 | 48 | 40 | 46 | 65 | 0.42808 | 0.195 |
| TEST TRACKS | 41206 | 5 | 48 | 100 | 46 | 65 | 0.42802 | |
| USER ZONE 0 | 41200 | 848 | 48 | 20800 | 46 | 53 | 0.41745 | 40.625 |
| USER ZONE 1 | 40182.4 | 864 | 47 | 20800 | 45 | 54 | 0.41533 | 40.625 |
| USER ZONE 2 | 39145.6 | 880 | 46 | 20800 | 44 | 55 | 0.41291 | 40.625 |
| USER ZONE 3 | 38089.6 | 912 | 45 | 20800 | 43 | 57 | 0.40996 | 40.625 |
| USER ZONE 4 | 36995.2 | 944 | 43 | 20800 | 41 | 59 | 0.41589 | 40.625 |
| USER ZONE 5 | 35862.4 | 976 | 42 | 20800 | 40 | 61 | 0.41189 | 40.625 |
| USER ZONE 6 | 34691.2 | 1024 | 40 | 20800 | 38 | 64 | 0.41716 | 40.625 |
| USER ZONE 7 | 33462.4 | 1056 | 39 | 20800 | 37 | 66 | 0.41166 | 40.625 |
| USER ZONE 8 | 32195.2 | 1120 | 37 | 20800 | 35 | 70 | 0.4158 | 40.625 |
| USER ZONE 9 | 30851.2 | 1184 | 35 | 20800 | 33 | 74 | 0.41931 | 40.625 |
| USER ZONE 10 | 29430.4 | 1216 | 34 | 20800 | 32 | 76 | 0.41024 | 40.625 |
| USER ZONE 11 | 27971.2 | 1296 | 32 | 20800 | 30 | 81 | 0.41165 | 40.625 |
| USER ZONE 12 | 26416 | 1392 | 30 | 20800 | 28 | 87 | 0.41133 | 40.625 |
| USER ZONE 13 | 24745.6 | 1488 | 28 | 20800 | 26 | 93 | 0.40891 | 40.625 |
| USER ZONE 14 | 22960 | 1696 | 25 | 20800 | 23 | 106 | 0.41738 | 40.625 |
| USER ZONE 15 | 20924.8 | 770 | 24 | 9100 | 22 | 110 | 0.41557 | 17.773 |
| TEST TRACKS | 20000.8 | 5 | 24 | 50 | 22 | 130 | 0.41545 | 0.098 |
| BUFFER TRACKS | 19994.8 | 2 | 24 | 20 | 22 | 130 | 0.4154 | 0.039 |
| CONTROL TRACKS | 19992.4 | 5 | 24 | 50 | 22 | 130 | 0.41527 | 0.098 |
| BUFFER TRACKS | 19986.4 | 2 | 24 | 20 | 22 | 130 | 0.41522 | 0.039 |
| | 19984 | 820 | 24 | | | | | |
| GCP | 19000 | | | | | | | |

FIG.13

☐ OUTER CIRCUMFERENTIAL SFP TRACK PHYSICAL ADDRESS
BIT 15 ~ BIT 0 : \*\*\*\*\*\*\*\*

DISK SHAPED RECORDING MEDIUM AND DRIVE APPARATUS UTILIZING LOGICAL BLOCK ADDRESS CONVERSION AND START ADDRESSES WHICH INCREASE FROM INNER AND OUTER CIRCUMFERENTIAL SIDES OF THE MEDIUM

TECHNICAL FIELD

This invention relates to a drive apparatus and a drive method for accessing a disc-shaped recording medium including reproduction (playback) only area and recordable/reproducible area, and a disc-shaped recording medium suitable when used in such apparatus and method.

BACKGROUND ART

Hitherto, as the disc-shaped recording medium, a reproduction (playback) only read only memory (ROM) disc such as digital audio disc, etc. including reproduction (playback) only area where data are recorded by emboss pits, random access memory (RAM) disc including data recordable area by the magnetic recording film or the magneto-optical recording film, hybrid (type) disc including reproduction (playback) only ROM area where data are recorded by emboss pits and data re-recordable RAM area by the magneto-optical (MO) recording film, and the like are known.

In the hybrid disc, management information for carrying out management of data recorded in the reproduction (playback) only area is recorded in the reproduction only area, thus to carry out management of data of the reproduction only area on the basis of the management information reproduced from the reproduction only area. Moreover, management information for carrying out management of data recorded in the recordable area is recorded in the recordable area, thus to carry out management of the recordable area on the basis of the management information reproduced from the recordable area.

For example, in the optical disc, there is a hybrid optical disc in which the reproduction (playback) only areas and the recordable/reproducible areas are formed with the information recording surface being divided into such areas. In the optical disc device to which such hybrid optical disc is applied, desired data can be reproduced by the reproduction systems corresponding to respective areas, and desired data can be recorded by recording/reproduction systems corresponding to the recordable areas.

Namely, this hybrid optical disc is such that the area of the inner circumferential side is allocated (assigned) to the reproduction only area and predetermined data are recorded in advance in this area by emboss pits similar to those of the digital audio disc. On the contrary, the area of the outer circumferential side is allocated (assigned) to the recordable/reproducible area, and the magnetic recording film to be magnetized in a perpendicular direction of the disc is formed therein.

Further, as the optical disc system for scanning tracks formed in concentrical form or in spiral form by laser beams to carry out recording/reproduction of various data, there are known the optical disc system based on the CLV (Constant Linear Velocity) system for rotationally driving the optical disc at CLV to carry out recording/reproduction of data, and the optical disc system based on the CAV (Constant Angular Velocity) system for rotationally driving the optical disc at CAV to carry out recording/reproduction of data. Furthermore, in the case of the disc of the CAV system, there are instances where there is employed the zone CAV system in which because the recording density of the outer circumferential side is lowered, the transfer speed of the outer circumferential side is caused to be higher than the transfer speed of the inner circumferential side to allow the linear density of the inner circumferential side and that of the outer circumferential side to be the same.

In addition, the optical disc system based on the continuous servo system in which pregrooves continuously provided along tracks are used to carry out the tracking control, etc., and the optical disc system based on the sample servo system for carrying out the tracking control, etc. by making use of servo areas discretely provided on tracks are known.

Generally, the disc management area of the disc consists of a boot area, a data area management area, a root directory area, and a data area.

The boot area is the area for reading OS (Operating System) included (stored) in the data area to carry out starting of the system, and boot data, which are different for every kind of host computer are included (stored) therein. Moreover, the data area management area is the area for carrying out management of used (already used) area and unused (not yet used) area of the data area, and management data is rewritten every time rewrite operation of data is carried out. Further, the root directory area is the area for containing (storing) file information contained (stored) in the root directory, and data can be rewritten if the file name included (stored) in the root directory is rewritten, or is increased. In addition, the data area is the area in which the content of file and/or subdirectory information are included (stored).

Meanwhile, in the case of the hybrid disc including the ROM area and the RAM area, when the ROM area is disposed (allocated) at the leading side of the physical block address on the disc, the 0-th address of the logical block address when viewed from the host computer side would be the leading portion of the ROM area, resulting in the problem that the hybrid disc cannot be used as the so-called boot device. Namely, since data, which are different for every kind of host computer are contained (stored) in the boot area for reading OS included (stored) in the data area to carry out starting of the system, the leading portion of the physical block address is required to be the RAM area.

Further, in the case of the hybrid disc employing the zone CAV system, when, e.g., the ROM area is disposed (allocated) at the inner circumferential side of the disc, it is inconvenient to contain (store), within the ROM area, picture data, etc. for which high speed transfer is required.

In addition, in the case where there is any defect in the RAM area, it is necessary to record in advance defect information indicating defect position in the Defect Management Area (DMA) to carry out recording/reproduction of recording data while avoiding the defect position. In the conventional hybrid disc, since the same defect information is recorded in respective defect management areas respectively provided immediately before and immediately after the user area collectively including the ROM area and the RAM area as shown in FIG. 1, the defect management area of the inner circumferential side and the defect management area of the outer circumferential side are greatly spaced (apart) from each other. For this reason, the seek operation in writing defect information requires much time, resulting in the problem that the access speed is lowered.

With the above in view, an object of this invention is to provide a drive apparatus and a drive method for a disc-shaped recording medium which can use the disc-shaped recording medium as the boot device, and a disc-shaped recording medium adapted thereto.

Another object of this invention is to provide a drive apparatus and a drive method for a disc-shaped recording medium, and a disc-shaped recording medium in which the seek time in writing defect information is shortened so that the access speed is permitted to be high.

DISCLOSURE OF THE INVENTION

This invention is directed to a disc-shaped recording medium drive apparatus for driving a disc-shaped recording medium in which the area on the medium (i.e., information recording surface thereof) is divided into at least two areas including a recordable area and a reproduction (playback) only area every certain (arbitrary) radial section, and addresses are caused to be increased from one end side toward the other end side in a radial direction in the respective areas, the apparatus comprising: address input means for inputting a first address; address converting means in which in the state where definition is made such that an area located at the extreme one end side is positioned succeedingly to an area located at the extreme other end side, one end side of the recordable area located at the extreme one end side is caused to be start address, whereby the address converting means converts the first address into a second address of which value increases (increments) in order from the area succeeding to the recordable area located at the extreme one end side; and access means for accessing the disc-shaped recording medium on the basis of the second address.

Further, this invention is directed to a disc-shaped recording medium drive method of driving a disc-shaped recording medium in which the area on the medium (i.e., information recording surface thereof) is divided into at least two areas including a recordable area and a reproduction only area every certain radial section, and addresses are caused to be increased from one end side toward the other end side in a radial direction in the respective areas, the method comprising steps of: allowing one end side of the recordable area located at the extreme one end side to be start address in the state where definition is made such that an area located at the extreme one end side is positioned succeedingly to an area located at the extreme other end side to convert an inputted first address into a second address of which value increases (increments) in order from the area succeeding to the recordable area located at the extreme one end side; and accessing the disc-shaped recording medium on the basis of the second address.

A disc-shaped recording medium according to this invention is characterized in that the area on the medium (i.e., information recording surface thereof) is divided into at least two areas including a recordable area and a reproduction only area every certain radial section, addresses are caused to be increased from the outer circumferential side toward the inner circumferential side in the respective areas, and addresses increasing (incrementing) in order from the outer circumferential side of the recordable area located at the outermost circumferential side are given (assigned).

Further, a disc-shaped recording medium according to this invention is characterized in that the area on the medium (i.e., information recording surface thereof) is divided into at least two areas including a recordable area and a reproduction only area every certain radial section, addresses are caused to be increased from the inner circumferential side toward the outer circumferential side in the respective areas, and addresses increasing (incrementing) in order from the outer circumferential side of the recordable area located at the outermost circumferential side are given (assigned).

In addition, a disc-shaped recording medium according to this invention is characterized in that the area on the medium (i.e., information recording surface thereof) is divided into at least two areas including a recordable area and a reproduction only area every certain radial section, and defect information recording areas for recording defect information indicating defect position within the medium are respectively provided at the outer circumferential end portion of the recordable area located at the outermost circumferential side and the inner circumferential end portion of the recordable area located at the innermost circumferential side.

BRIEF DESCRIPTION OF THE DRAWINGS

FIG. 10 is a view showing the data format of data sector in the optical disc.

FIG. 13 is a view showing setting parameter of area division in the optical disc.

BEST MODE FOR CARRYING OUT THE INVENTION

Best mode (form) for carrying out this invention will now be described in detail with reference to the attached drawings.

Initially, the format of an optical disc to which this invention is applied will be described below. This optical disc is an optical disc of the zone CAV system and of the sample servo system. In addition, this optical disc includes a ROM area common in the format to the reproduction (playback) only ROM disc, and a RAM area common in the format to the re-recordable RAM disc.

Figure 1:
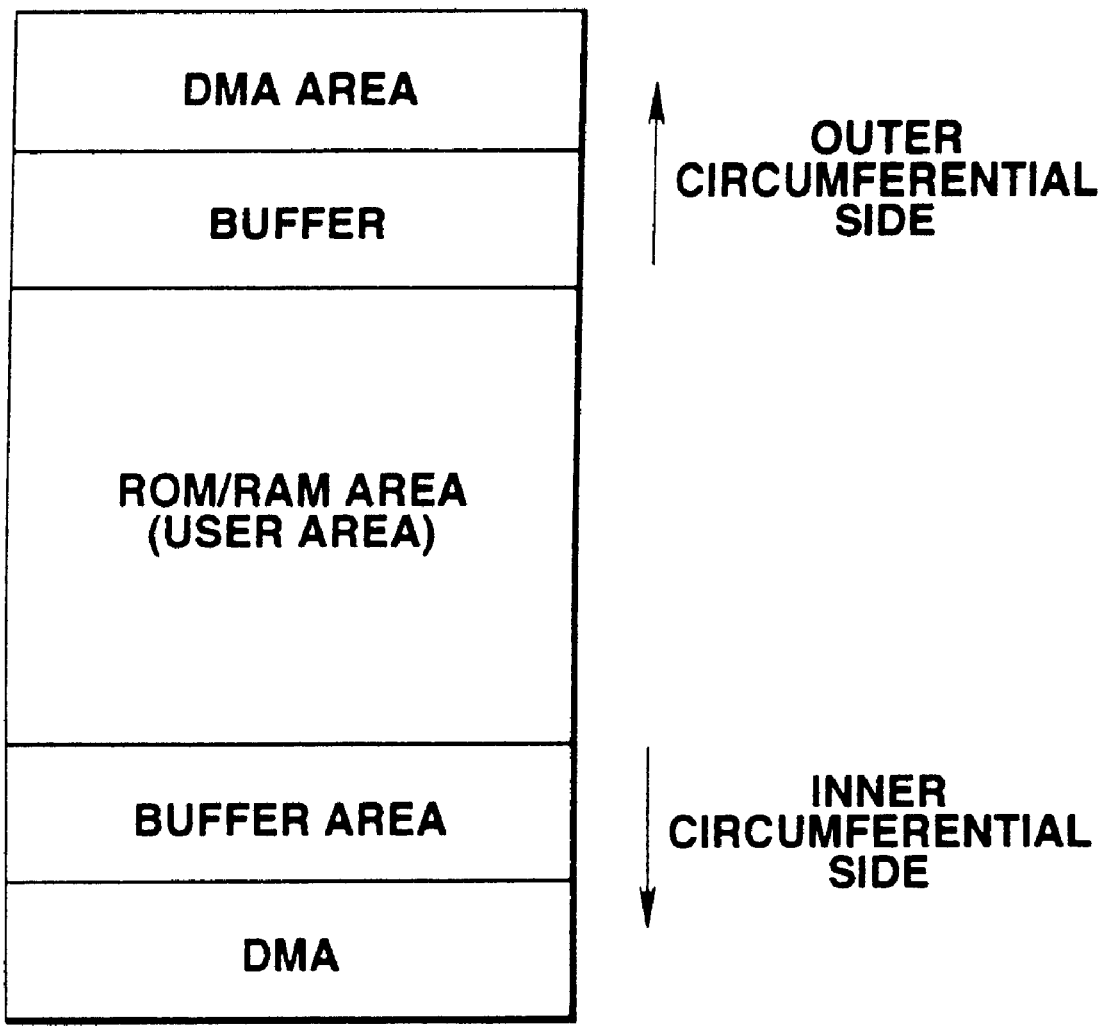
FIG. 1 is a view for explaining arrangement position of defect management area and buffer area in a conventional hybrid disc.
Figure 2:
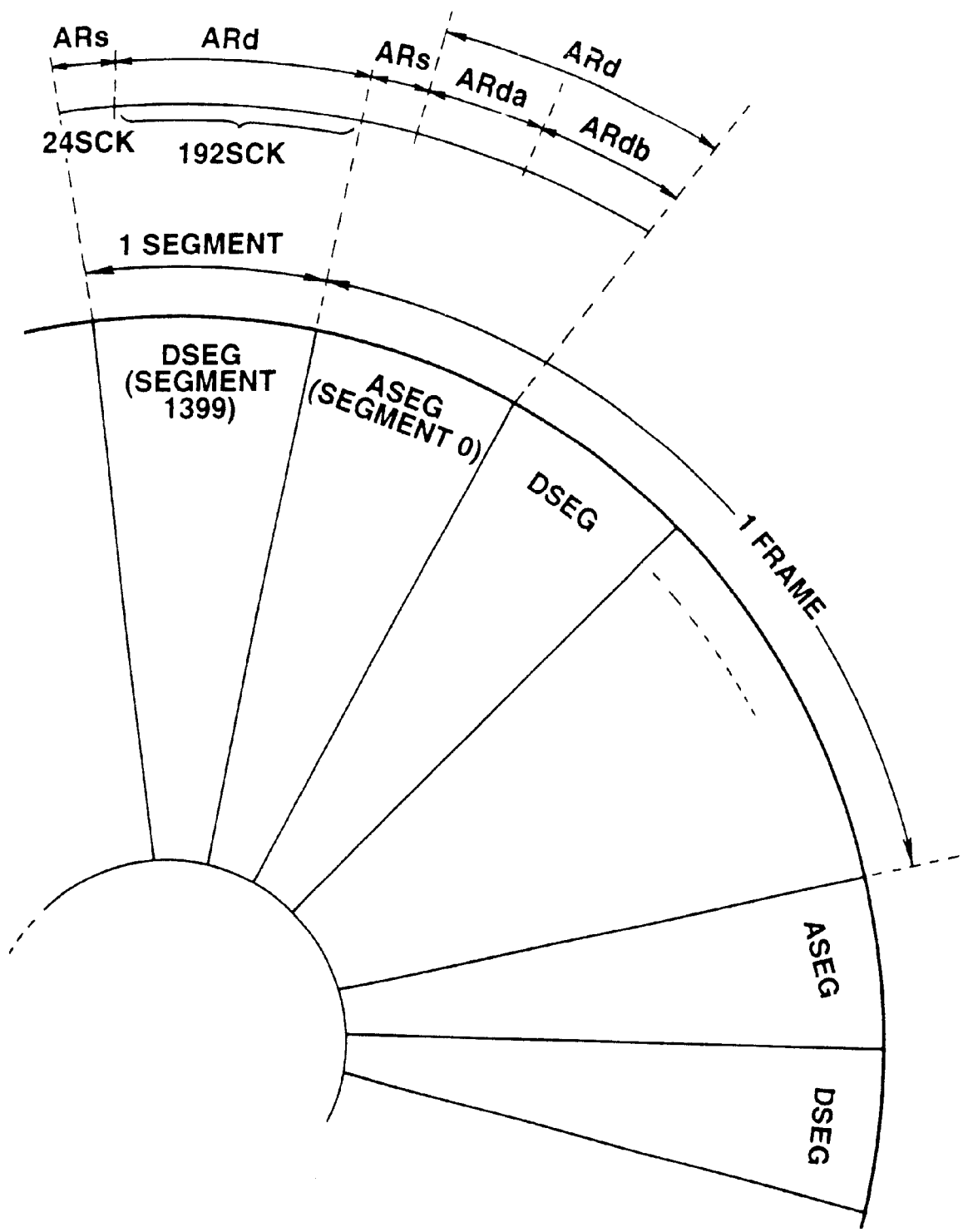
FIG. 2 is a view showing segment structure of optical disc to which this invention is applied.

This optical disc is of a structure, as shown in FIG. 2, for example, in which one circumferential track is divided into 1400 segments (segment 0~segment 1399), wherein those segments are classified into address segments ASEG and data segments DSEG.

Figure 9:
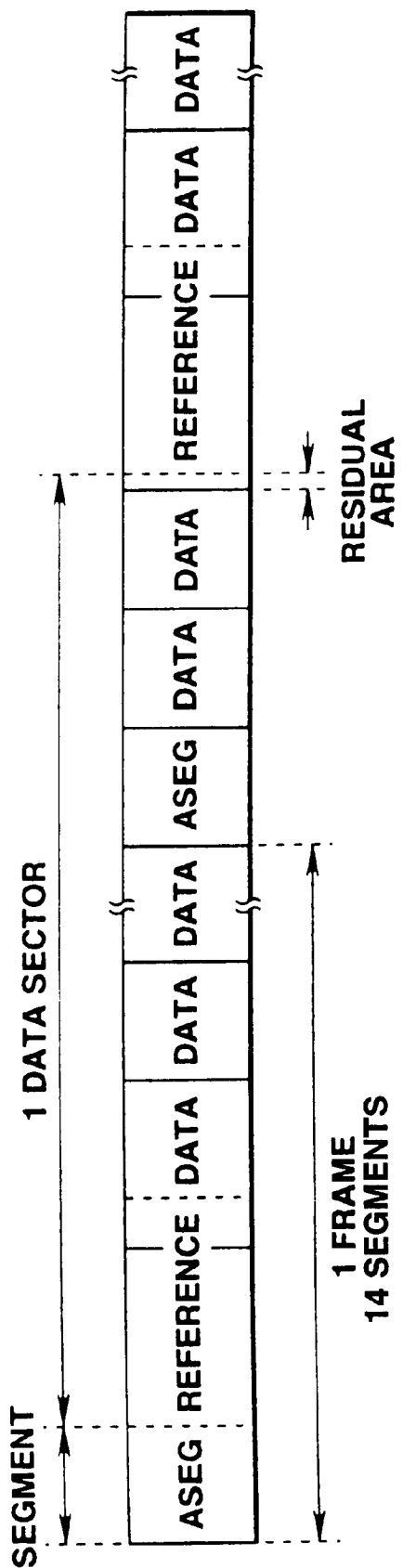
FIG. 9 is a view showing the configuration of-one frame and one data sector in the optical disc.

At respective tracks of the address segment ASEG, position information in the radial direction, i.e., track numbers, and position information in the tangential direction, i.e., segment numbers on the disc are recorded in advance by emboss pits. Namely, emboss pits are formed at the time of preparation of the optical disc on the basis of position information. These address segments ASEG exist every 14 segments, and 100 address segments exist with respect to one circumferential track. As shown in FIG. 9, the area from a certain address segment ASEG to the next address segment ASEG is one frame, and 100 frames exist with respect to one circumferential track. 13 segments between continuous two address segments ASEG are data segment DSEG. 1300 data segments DSEG exist with respect to one round (circumference). Moreover, respective segments consist of areas corresponding to 216 servo clocks, and consists of servo areas ARs corresponding to 24 servo clocks and data areas ARd corresponding to 192 servo clocks. In the address segment ASEG, the data area ARd consists of address area ARda and laser control area ARdb.

The RAM area will now be described with reference to FIGS. 3A to 3E. In the servo area ARs, as shown in FIGS. 3A to 3E, three emboss pits Pa, Pb, Pc each having length corresponding to 2 servo clocks are recorded in advance in the state where respective centers between these three emboss pits Pa, Pb, Pc are spaced by the length corresponding to 5 servo clocks, and a focus sample area ARfs having length corresponding to 6 clocks is provided.

By allowing emboss pits Pa, Pb, Pc of the servo area ARs to respectively have lengths corresponding to 2 servo clocks, the portion where no emboss pit is formed, i.e., the mirror portion is reduced. Thus, ghost pit, etc. taking place at the time of molding of the disc can be difficult to take place. Further, since RF signals are stably reproduced from emboss pits Pb, Pc at the time of access, it becomes possible to stably generate various servo signals such as a tracking servo signal, etc. on the basis of the RF signals reproduced from the emboss pits Pb, Pc. In addition, by allowing spacings (intervals) between centers of respective emboss pits Pa, Pb, Pc to be more than a predetermined value, data interference between RF signals reproduced from the respective emboss pits Pa, Pb, Pc can be reduced to an extremely small value. In order to reduce the data interference between respective emboss pits, it is desirable that the respective emboss pits Pa, Pb, Pc be spaced from each other by more than 5 servo clocks.

The second pit Pb located at the 11-th~12-th clock time interval and the third pit Pc located at the 16-th~17-th time period are wobble pits placed at the positions respectively shifted by ¼ tracks in the radial direction of the disc from the track center. Tracking error information is provided by difference between amplitude values of RF signals reproduced from these pits Pb, Pc. Moreover, as described later, phase information of the servo clock is obtained by taking the difference between amplitude values of both peak portions of the RF signals reproduced from these pits Pb, Pc. Further, clock phase information which is not dependent upon the tracking state is provided by adding this phase information.

Moreover, the first pit Pa located at the beginning of the servo area ARs is classified, depending upon its position, address mark ADM indicating that corresponding segment is address segment ASEG, first sector mark STM1 indicating that corresponding segment is the leading segment of the sector, second sector mark STM2 indicating that the next segment is the leading segment of the sector, and segment mark SGM in the case where corresponding segment does not indicate any one of the above-mentioned segments.

Figure 3:
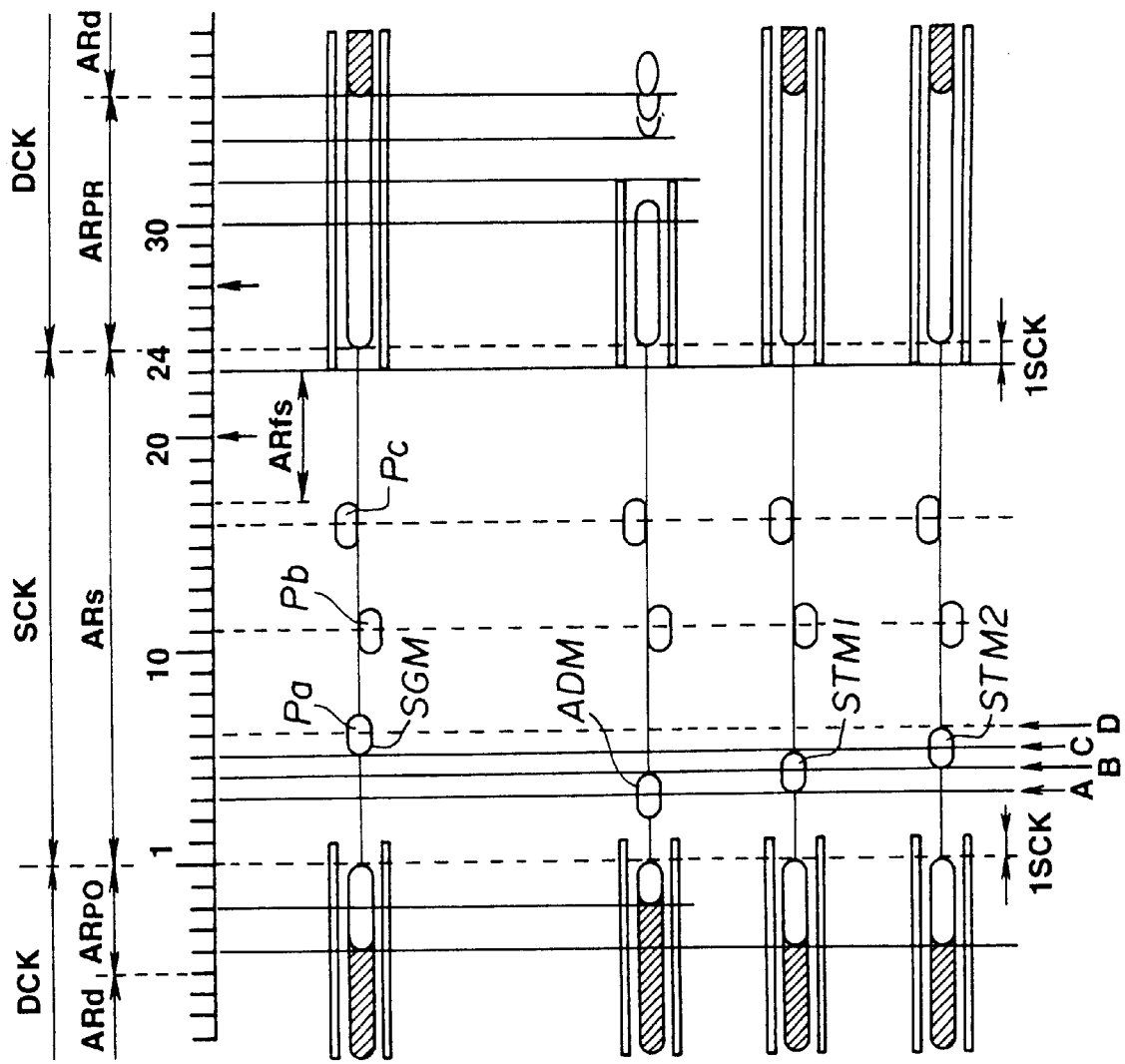
FIGS. 3A–3E are views showing the format of RAM area of the optical disc.
Figure 4:
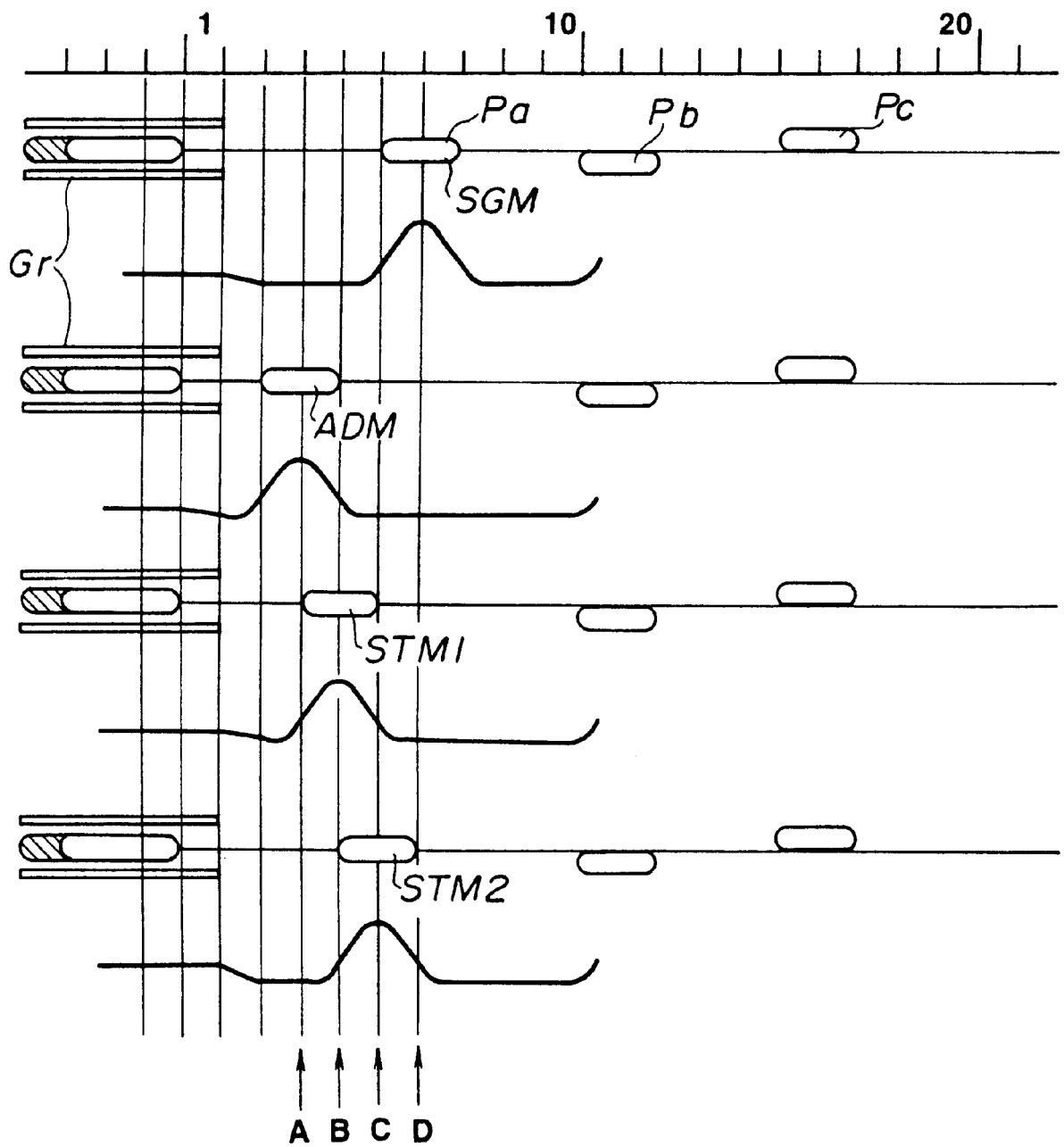
FIG. 4 is a view showing the detection system for first pit of servo area in the optical disc.

The first pit Pa becomes address mark ADM in the case where it is located at the third~fourth clock time period as shown in FIG. 3C, becomes first sector mark STM in the case where it is located at the fourth~fifth clock time period as shown in FIG. 3D, and becomes second sector mark STM2 in the case where it is located at the fifth~sixth clock time period as shown in FIG. 3E. It is to be noted that start positions of respective sectors will be described later with reference to FIG. 15. As shown in FIG. 4, for example, information indicated by the first pit Pa can be discriminated by examining position where reproduced RF signal takes maximum amplitude value by the difference maximum value detection, i.e., the so-called differential detection method.

Since information indicating the address mark ADM or the first sector mark STM1 and the second sector mark STM2 is given by the first pit Pa present at the beginning of the servo area ARs as stated above, it is not required to record a sector number or a track address in sector units.

Figure 5:
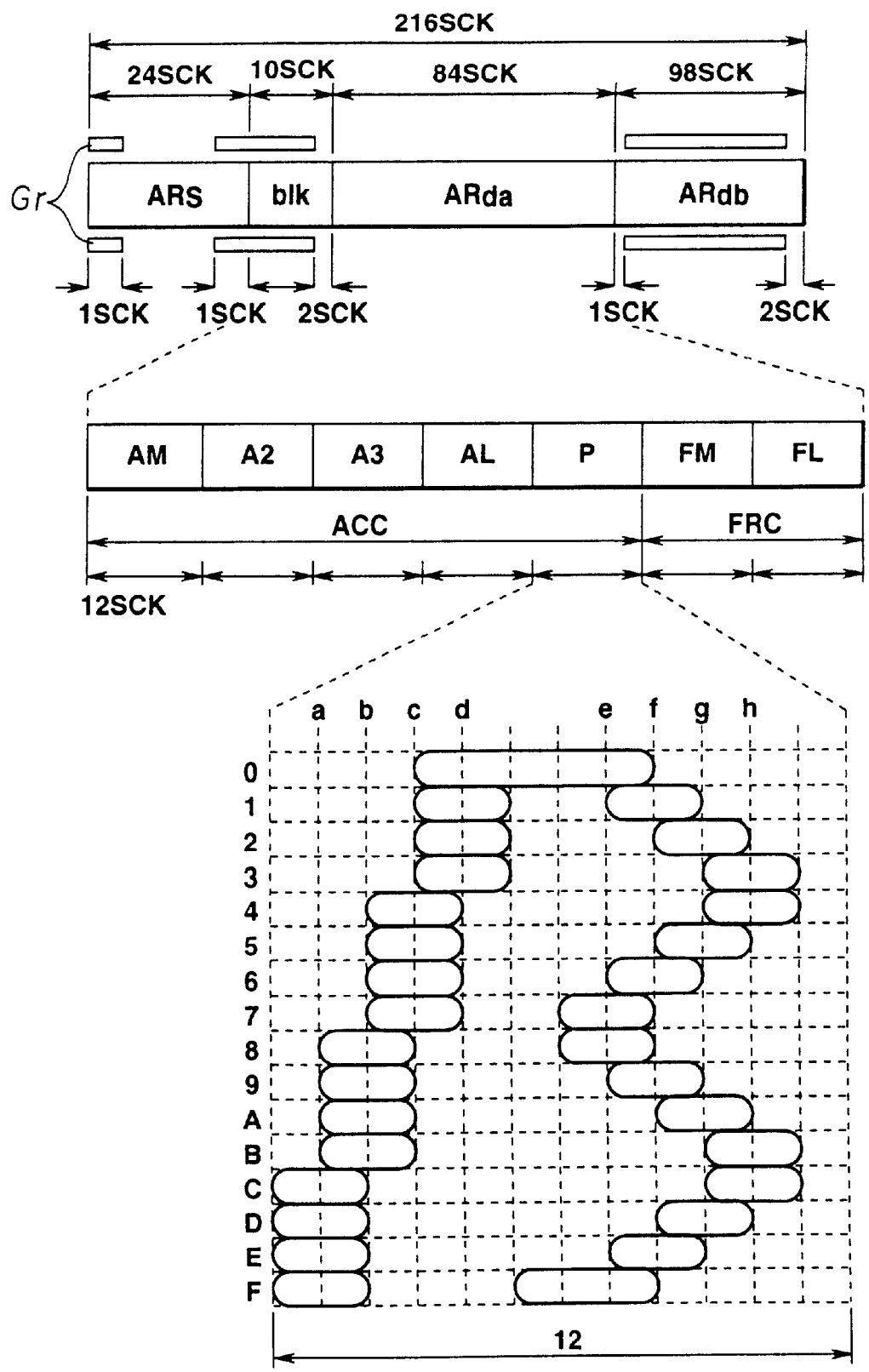
FIG. 5 is a view showing the format of address segment in the optical disc.

Moreover, in the address segment ASEG, as shown in FIG. 5, access code ACC consisting of track addresses [AM], [A2], [A3], [AL] of 16 bits and its parity [P] as position information in the radial direction of the disc, and frame code FRC consisting of frame addresses [FM], [FL] as position information in the tangential direction of the disc are recorded in advance by emboss pits in the state where they are respectively changed into gray codes.

This track address is Physical Block Address (PBA), and is adapted to take a value which increases from one end side toward the other end side in the radial direction, i.e., from the outer circumferential side toward the inner circumferential side, or from the inner circumferential side toward the outer circumferential side. In the optical disc of this embodiment, physical block addresses PBA2 of which value increases from the outer circumferential side toward the inner circumferential side are given (assigned).

The access code ACC is adapted so that track addresses of 16 bits are divided by 4 bits. Such access code is employed to carry out table conversion based on the gray code table shown in FIG. 5 in order of A2=11~8 bit (2SN), A3=7~4 bit (3SN), AL=3~0 bit (LSN) from AM=15~12 bit (MSN). In this instance, only when the least significant bit of the 4 bits is "1", a value obtained by taking 1's complement with respect to the next 4 bits is assumed to be provided. Thus, these access codes are caused to vary only one pattern between adjacent tracks. In addition, the parity codes are divided into groups depending on bit position, and results obtained by taking parity which becomes equal to 1 when the number of bits of which value is "1" is an even number in respective groups [15, 11, 7, 3], [14, 10, 6, 2], [13, 9, 5, 1], [12, 8, 4, 0] are recorded.

There is employed, as stated above, an approach in which only when the least significant bit of the 4 bits is "1", are these access codes caused to vary only one pattern between adjacent tracks as value obtained by taking 1's complement with respect to the next 4 bits, whereby in the case of "0" where the distance between an emboss pit indicating gray code of higher order 2 bits and an emboss pit indicating gray code of lower order 2 bits is the shortest with respect to the area corresponding to one clock at the central portion, and in the case of "F" where one emboss pit is located at the shortest distance and the other emboss pit is the longest distance, emboss pit is formed within the area corresponding to one clock at the central portion. Accordingly, the area corresponding to one clock at the central portion does not become mirror portions continuous in the radial direction. Therefore, flow of resin is permitted to be uniform at the time of disc molding. Thus, high quality disc molding can be made.

Figure 6:
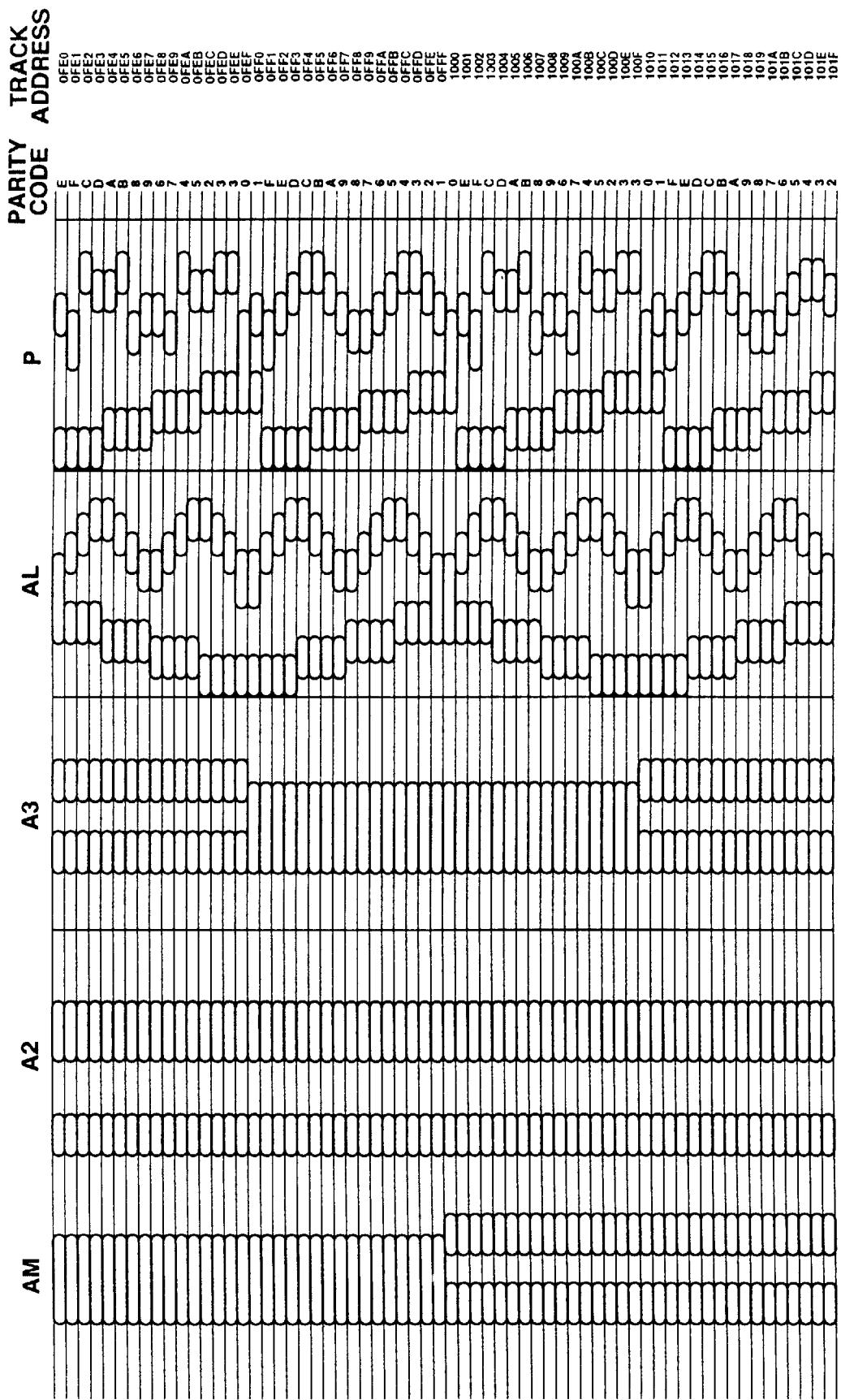
FIG. 6 is a view showing a portion of access code recorded in the address segment shown in FIG. 5.

Here, a portion of the access code ACC is shown in FIG. 6.

Moreover, the frame code FRC is adapted so that information in the tangential direction of the address segment ASEG, i.e., frame addresses of 8 bits indicating frame number are divided by 4 bits in upper and lower directions, and the higher order 4 bits FM=7~4 bits (MSN) and the lower order 4 bits LM=3~0 bits (MSN) are recorded in the state changed into gray code by the same method as in the case of the above-described access code. Although information of 8 bits can be recorded in this frame code, its value only exists in fact up to numbers 0 to 99 of the address segment ASEG.

In this example, the focus sample area ARfs of the servo area ARs is the portion caused to be the mirror portion. In the optical disc drive unit, this area is used for carrying out focus servo, Automatic Power Control (APC) for read power and clamp of RF signal, etc. It is difficult to precisely specify positions of various sample pulses for this processing. Since it is predicted or considered that fluctuation (change) less than +/−0.5 servo clock pitch takes place. For this reason, the above-mentioned focus sample area is caused to be the mirror portion which has the area corresponding to six clocks as space for carrying out sampling by correct value without undergoing influence of modulation of level of RF signal by emboss pits even in the case where the above-mentioned fluctuation is applied.

Figure 7:
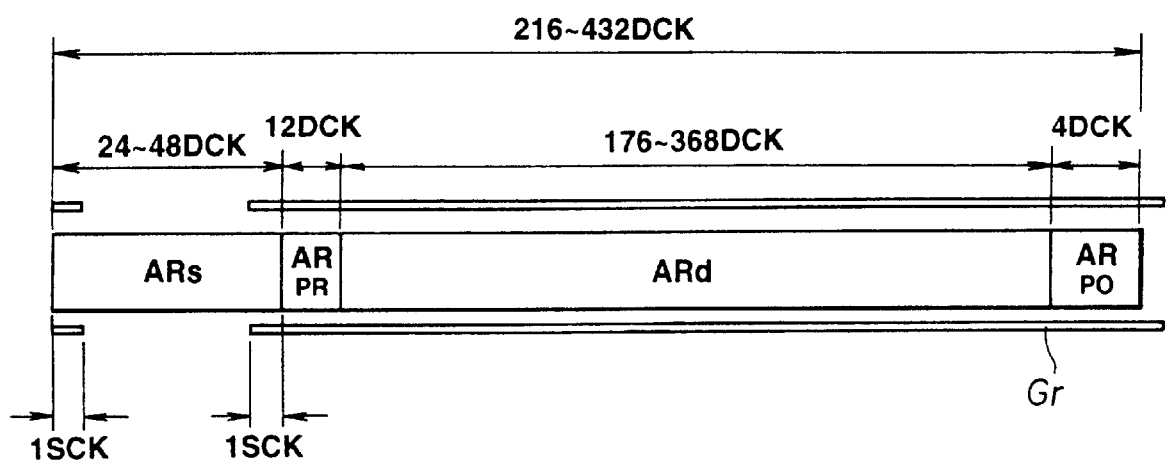
FIG. 7 is a view showing the format of data segment of RAM area in the optical disc.

Moreover, as shown in FIG. 7, the data area ARd of the data segment DSEG consists of data area ARd corresponding to 176~368 data clocks where user data are recorded, prewrite area $AR_{PR}$ corresponding to 12 data clocks, and post write area $AR_{PO}$ corresponding to 4 data clocks. It is to be noted that the number of data clocks changes depending upon the zone. The prewrite area $AR_{PR}$ is provided for use as a clamp area for ensuring distance required for preheat until the temperature of the disc is stable with respect to data recording from the time when drive starts irradiation of laser beams in the case where MO area exists as the RAM area, and for suppressing DC change due to double refraction, etc. of MO signal at the time of reproduction. It is to be noted that this prewrite area $AR_{PR}$ is provided also in the ROM disc for the purpose of taking compatibility of format. Further, the post write area $AR_{PO}$ is provided for eliminating erase remainder of recorded data at the time of overwrite, and for ensuring distance required for avoiding interference of data taking place by edge of groove Gr provided in the RAM area. This optical disc is bulk-erased in one direction at the time of shipping. With respect to the prewrite area $AR_{PR}$, data of the same polarity as that in the bulk erase direction is recorded. By employing such an approach, even if data is not normally recorded into the prewrite area $AR_{PO}$ because of insufficient preheat of media, recorded data are not changed. Accordingly, stable signals can be reproduced. In addition, the same data corresponding to 4 data clocks are recorded in advance in the post write area $AR_{PR}$. The reason why such an approach is employed is that it is effective that stable data trains which take fixed value exist in carrying out decoding from data backward in point of time in the Viterbi decoding.

FIG. 7 shows the view of the RAM area, and groove Gr of FIG. 7 is deleted in the ROM area.

Thus, stable signals can be obtained in carrying out clamp operation at the time of reproduction by making use of the prewrite area $AR_{PR}$. Accordingly, precise clamp operation can be carried out.

Figure 8:
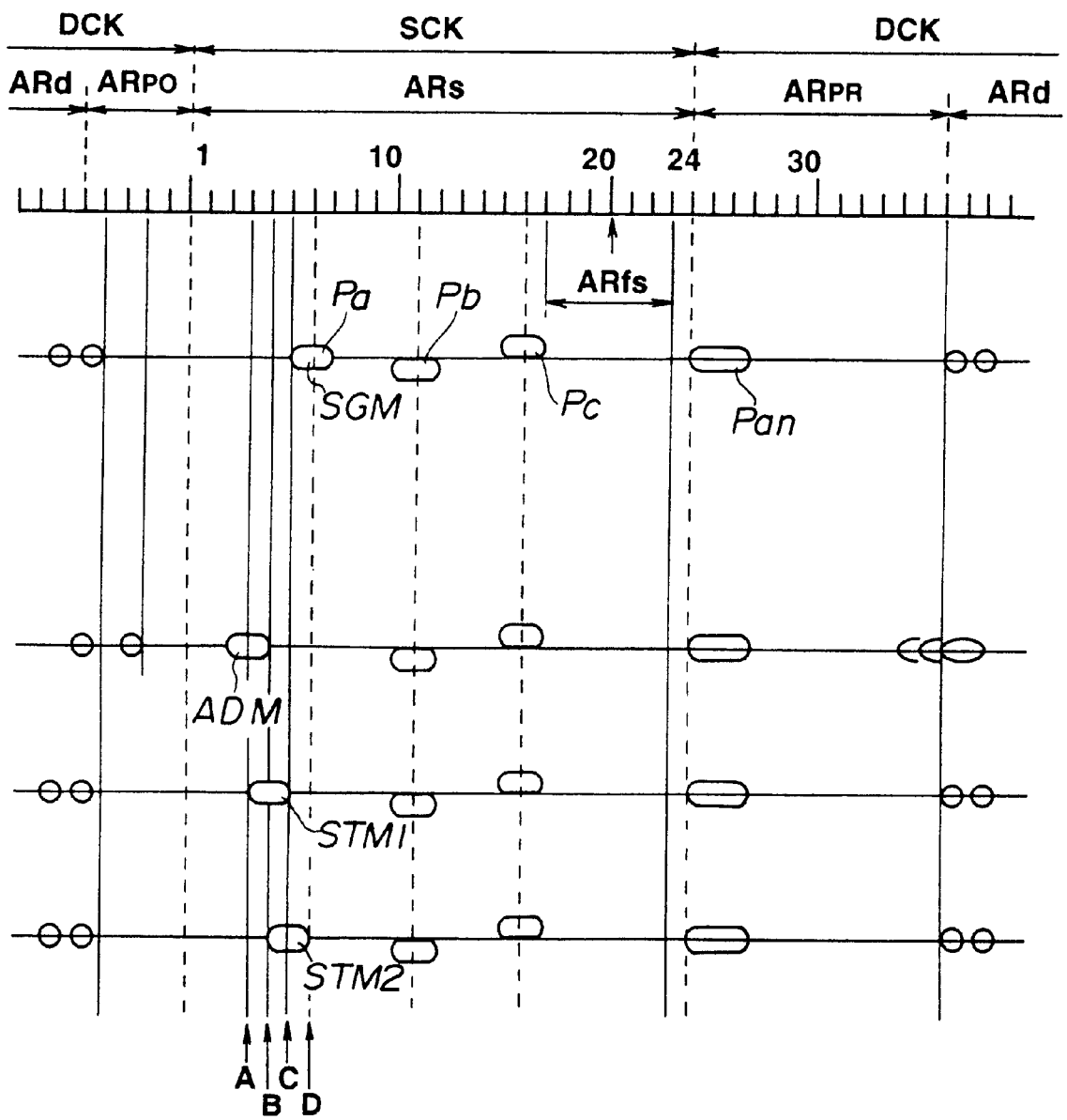
FIG. 8 is a view mainly showing the format of servo area in ROM area of the optical disc.

Here, in recordable optical disc such as magneto-optical disc, no emboss pit is formed in advance in the area where rewrite operation of data is carried out. Accordingly, the area serving as the mirror portion is broader than that of the reproduction only optical disc where data are formed in advance as emboss pits. Thus, groove Gr is provided at the portion corresponding to the data area ARd as shown in FIG. 7 to thereby reduce the mirror portion, thus making it possible to lessen bad influence in disc molding on the servo pits. Since the groove Gr is not used for tracking control, precision such as depth, etc. is not required. This groove is caused to have depth of $\lambda/8$ where wavelength of laser beam is designated at $\lambda$. Moreover, in the reproduction only ROM disc, as shown in FIG. 8, anchor pit Pan having area corresponding to 3 data clocks is provided at the leading portion of the data area ARd to thereby reduce the mirror portion, thus making it possible to lessen bad influence exerted on servo pits at the time of disc molding.

Figure 10:
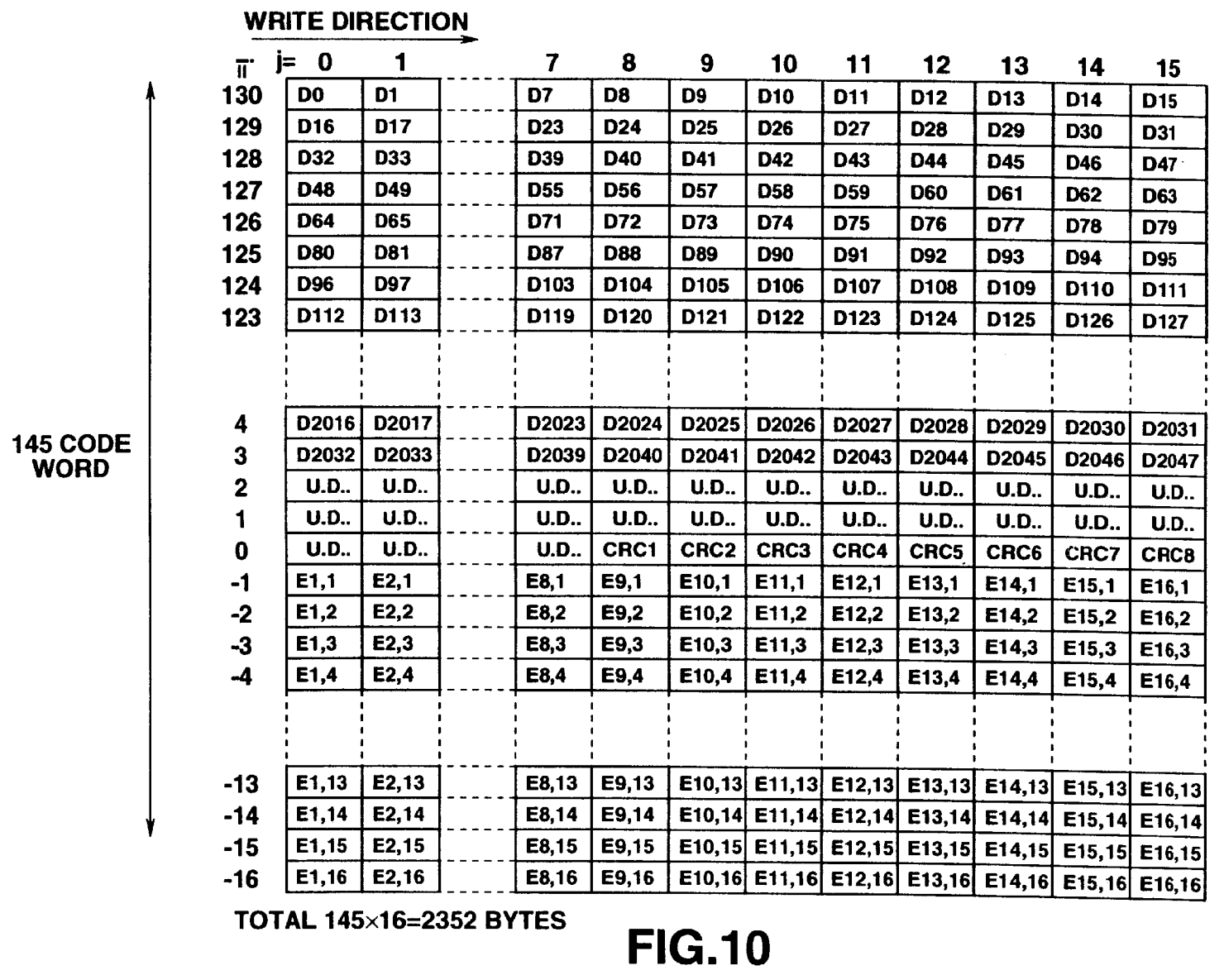

Moreover, as shown in FIGS. 9 and 10, one data sector consists of 2418 bytes in total of reference data 66 bytes, user data 2048 bytes (D0~D2047), ECC 256 bytes (E1, 1~E16, 16), CRC 8 bytes (CRC1~CRC8), and user defined data 40 bytes (UD). In FIG. 10, data format corresponding to 2352 bytes except for the reference data 66 bytes is shown.

Figure 11:
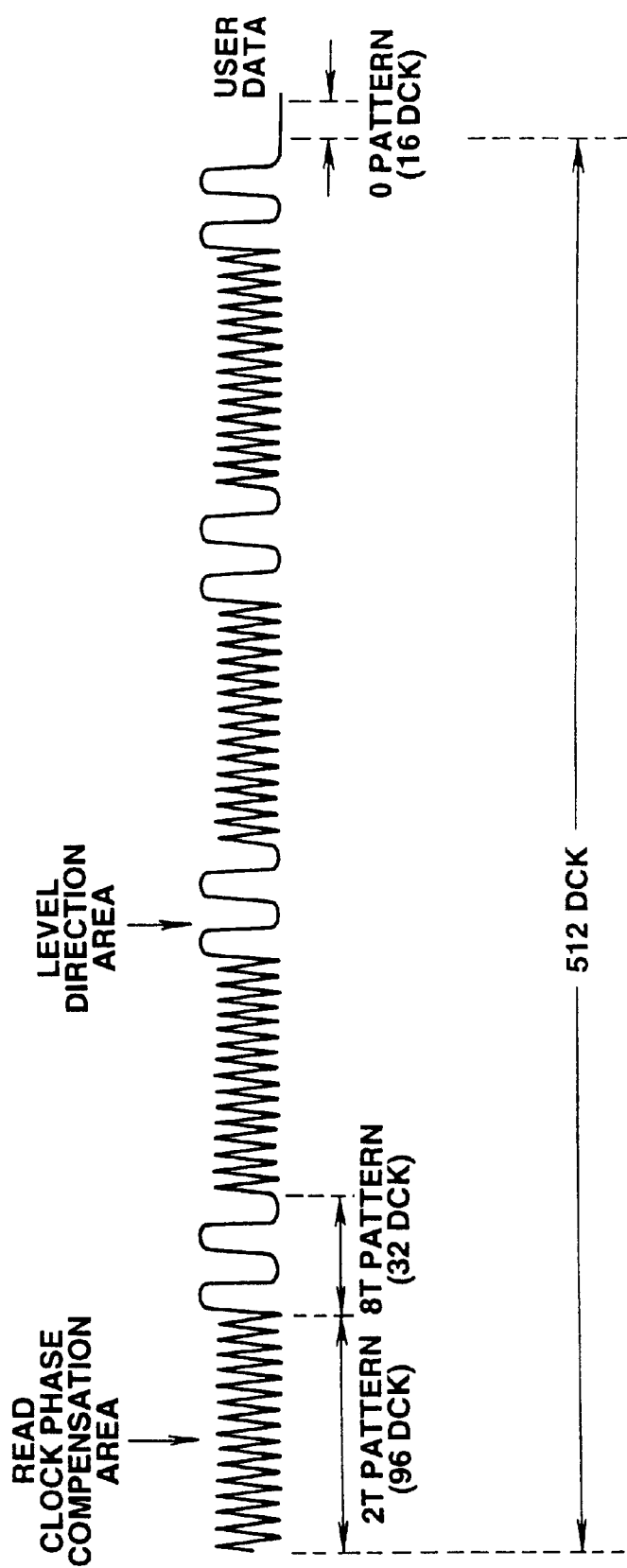
FIG. 11 is a view showing reproduction signal based on reference pattern of the data sector in the optical disc.

As the reference data, specific pattern corresponding to 66 bytes constituted with 4 blocks each consisting of 8T pattern corresponding to 4 bytes and 2T pattern corresponding to 12 bytes, and all 0 pattern of 2 bytes as margin for setting detected information are recorded as the waveform of the reproduction RF signal is shown in FIG. 11. The 8T pattern is used for setting partial response (1, 1) and ternary level (High H Medium M Low L) in the data detection by the Viterbi decoding, and the 2T pattern is used for correcting, at the time of reproduction, pit position shift in a DC manner by recording power change, etc.

In the data area ARd of the data segment DSEG, scramble is applied to data except for the reference data 66 bytes. Further, the data to which scramble has been applied, i.e., scrambled data are recorded after undergone NRZI conversion every segment.

Figure 12:
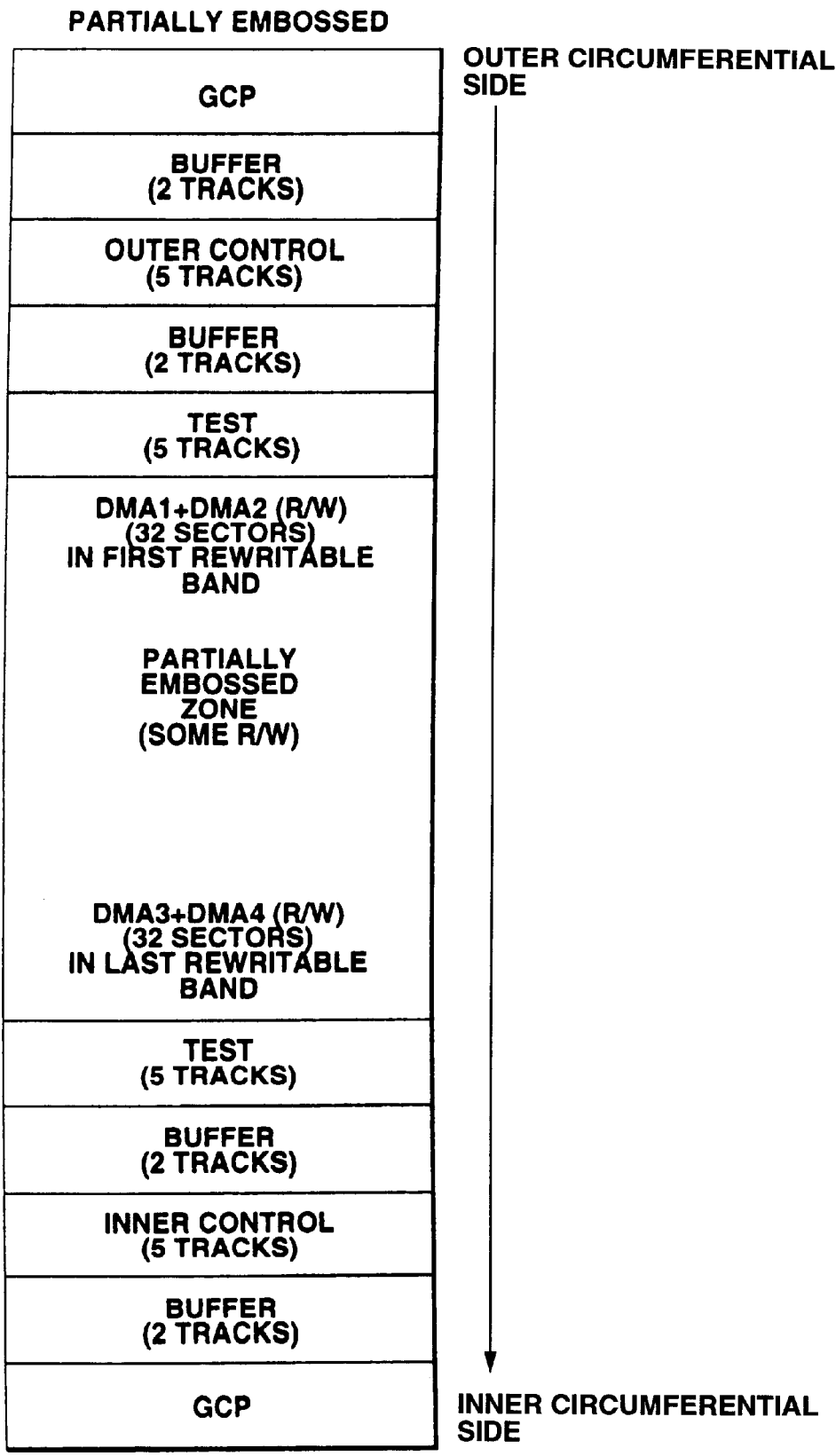
FIG. 12 is a view for explaining write (write-in) area of various information in the optical disc.

Further, this optical disc is the so-called CAV disc, and includes, as shown in FIG. 12, from the outer circumferential side, GCP (Gray Code Part) area, buffer area, outer control track area, buffer area, test area, user zone including recordable/reproducible RAM area and reproduction only ROM area for desired data by user, test area, buffer area, control track area, buffer area, and GCP area. The user zone is divided into plural zones.

Figure 14:
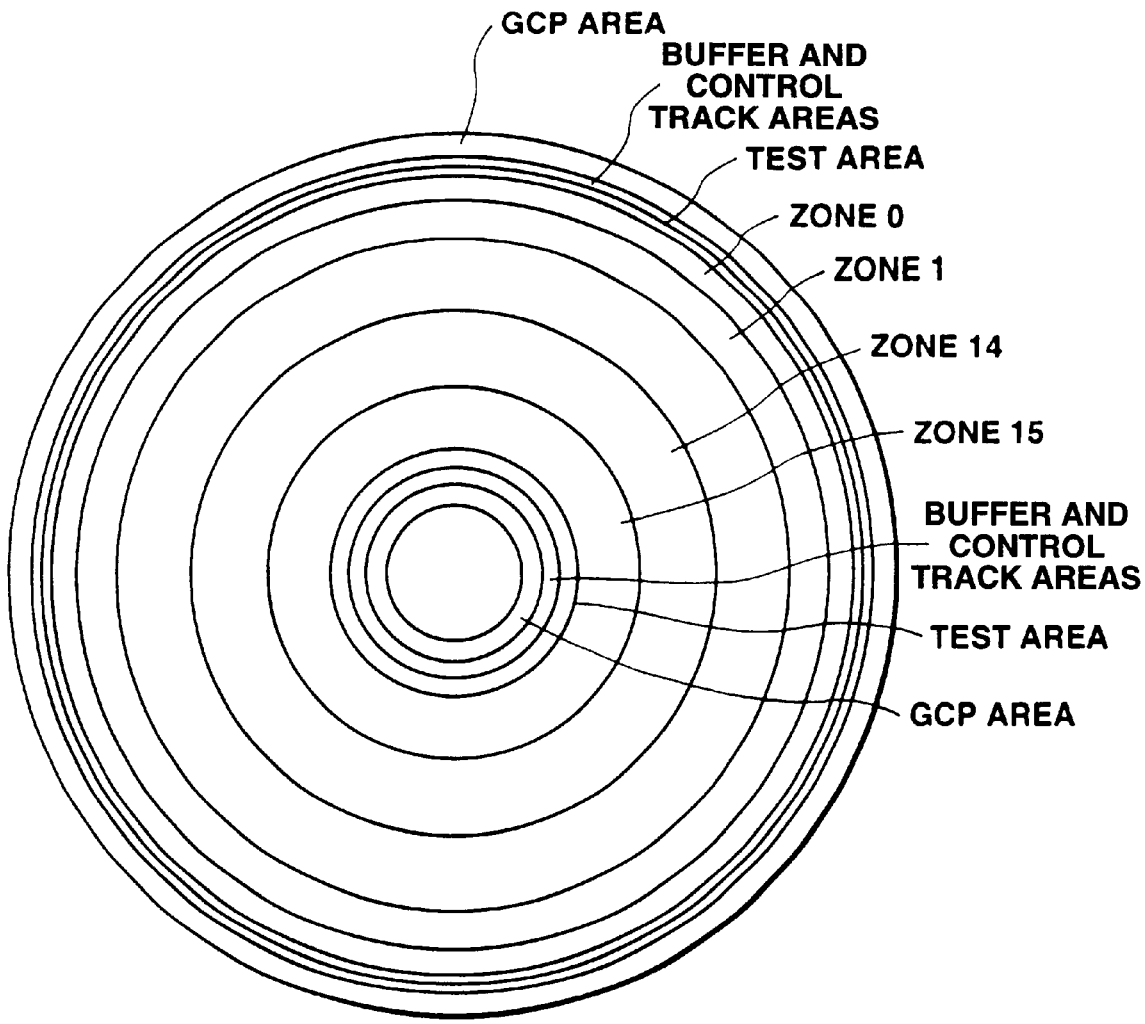
FIG. 14 is a view showing the state of area division in the optical disc.

In more practical sense, as shown in FIGS. 13 and 14, the user zone consists, from the outer circumferential side, of GCP area corresponding to 736 tracks, buffer track area corresponding to 2 tracks, control track area corresponding to 5 tracks, buffer track area corresponding to 2 tracks, test track area corresponding to 5 tracks, user zone 0 corresponding to 848 tracks, user zone 1 corresponding to 864 tracks, user zone 2 corresponding to 880 tracks, user zone 3 corresponding to 912 tracks, user zone 4 corresponding to 944 tracks, user zone 5 corresponding to 976 tracks, user zone 6 corresponding to 1024 tracks, user zone 7 corresponding to 1056 tracks, user zone 8 corresponding to 1120 tracks, user zone 9 corresponding to 1184 tracks, user zone 10 corresponding to 1216 tracks, user zone 11 corresponding to 1296 tracks, user zone 12 corresponding to 1392 tracks, user zone 13 corresponding to 1488 tracks, user zone 14 corresponding to 1696 tracks, user zone 15 corresponding to 770 tracks, test track area corresponding to 5 tracks, buffer track area corresponding to 2 tracks, control track area corresponding to 5 tracks, buffer track area corresponding to 2 tracks, and GCP area corresponding to 820 tracks.

In this hybrid optical disc, the above-mentioned user zone 0~15 is constituted with the reproduction (playback) only ROM area and the re-recordable RAM area.

When it is now assumed that the number of tracks within the zone is Tz, the number of data segments necessary for one sector within a certain zone is Dsz, and the number of data segments per each track is Dt, the number of sectors Sz within the zone is expressed, in order to complete the sector every zone and to allow the number of sectors to be constant, as follows:

$$Sz=Tz \cdot Dt/Dsz$$

It is sufficient to determine the number of tracks in order that the following relational expression holds.

$$Tz=K \cdot Dsz$$

Further, an approach is employed to allocate, from zones of the outer circumferential side, the number of sectors Sz determined by using, as value of K, values which become close to the data capacity per one zone obtained by dividing the data capacity of the entirety of the disc by the total number of zones to determine the data clock frequency so that the recording density of innermost circumferential track of corresponding zone is not above a predetermined density, thereby making it possible to obtain all parameters. Here, the capacity of one sector is assumed to be constant. In this example, the capacity of one sector is 2352 bytes.

Figure 15:
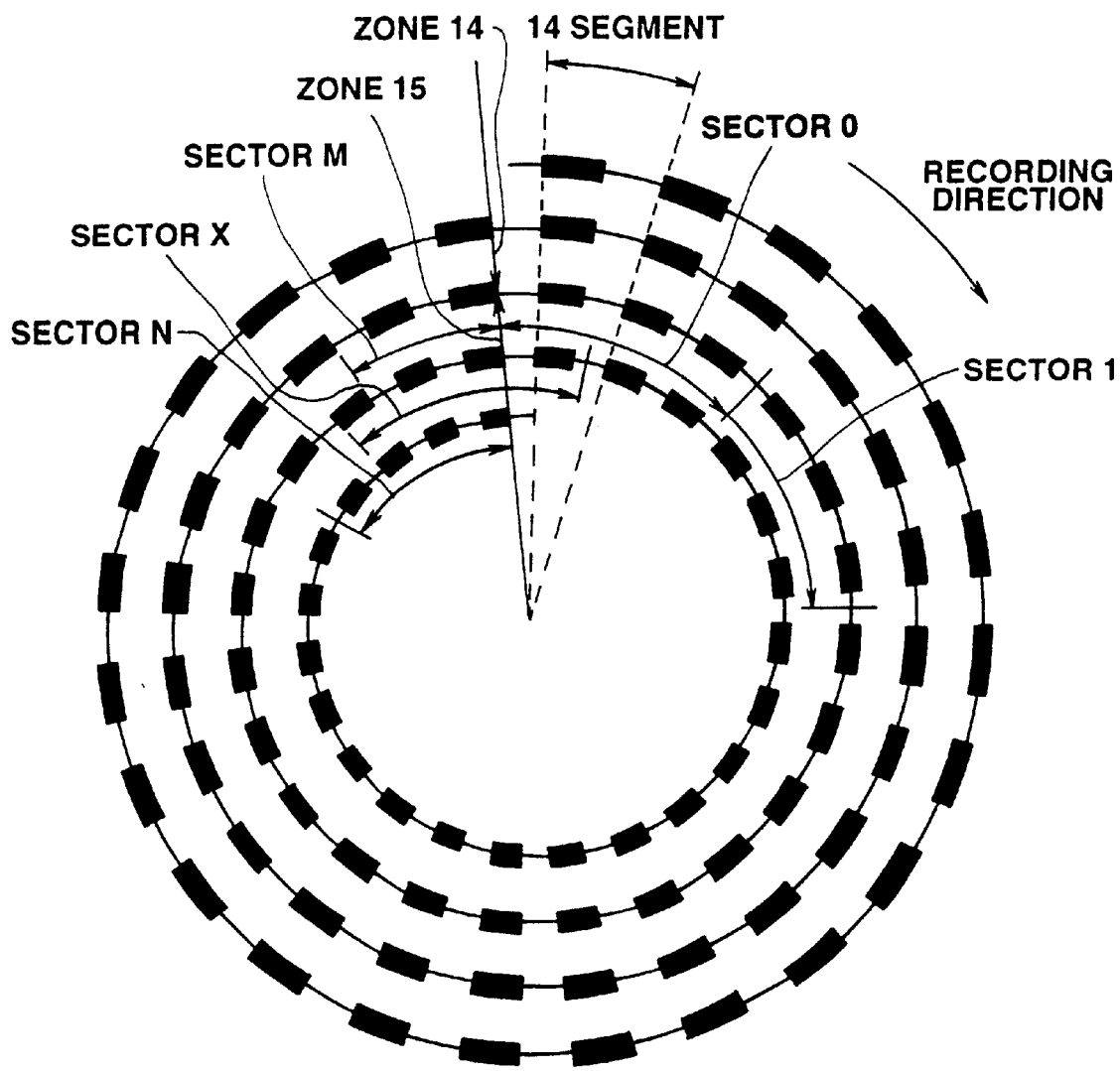
FIG. 15 is a view showing the format of data sector in the optical disc.

In this case, as shown in FIG. 15, when sector is started from a certain segment and the number of segments constituting one sector is completed, corresponding sector is completed to start the next sector from the next segment without allowing an excess byte to be the next sector therefrom even if any excess byte is present within the last segment.

Thus, at the leading portion of the zone, the sector necessarily starting with segment 0 of 0 frame code can be constituted. Moreover, when a parity sector is assumed to be provided with respect to certain number of sectors, the number of sectors within respective zones are caused to be uniform (equal), thereby permitting the capacity of the parity sector to be constant.

It is to be noted that while there is the possibility that the number of sectors within the innermost circumferential zone does not become equal to the number of sectors within other zones by the relationship with respect to the recording area so that any fraction may take place, the area up to the track where sector is ended with segment 1399 is assumed to be the innermost circumferential zone.

In this optical disc, the user zone is divided into 16 zones as described above, and the number of bytes per segment (byte/seg) and the number of segments per sector (seg/sector) are determined by data clock DCK generated by multiplying servo clock SCK by M/N. It is to be noted that M corresponds to value of clock in FIG. 13, and N is 24. Namely, when the number of the servo clocks within the servo area ARs is assumed to be N, and data clock DCK is a multiple of M/N of the servo clock SCK, the number of servo clocks within one segment SCKseg and the number of data clocks within one segment DCKseg are expressed as follows.

$$SCKteg=9N$$

$$DCKseg=SCKseg\ M/N.$$

In the above expression, M and N are integers.

Figure 16:
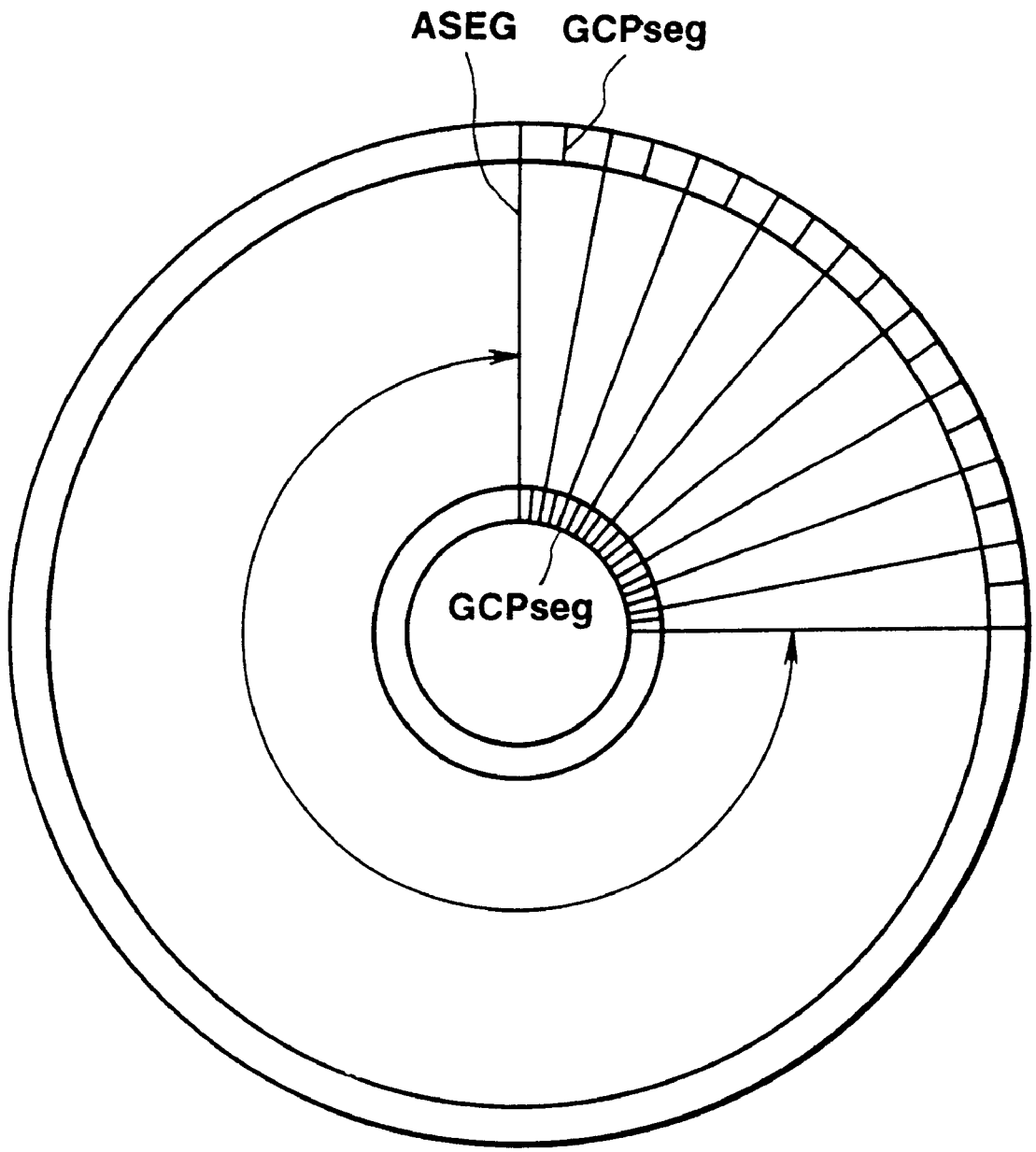
FIG. 16 is a view showing arrangement state of GCP segment in the optical disc.

Further, one track is divided into 1400 segments as described above, and 1300 segments thereof is data segment DSEG. In this case, since no user data is recorded into the GCP area, 100 segments of the 1300 data segments DSEG are used as GCP segment GCPseg for containing (storing) GCP information such as media information, etc. As shown in FIG. 16, the GCP segments GCPseg are allocated to data segment located at the intermediate positions of respective address segments ASEG.

Figure 17:
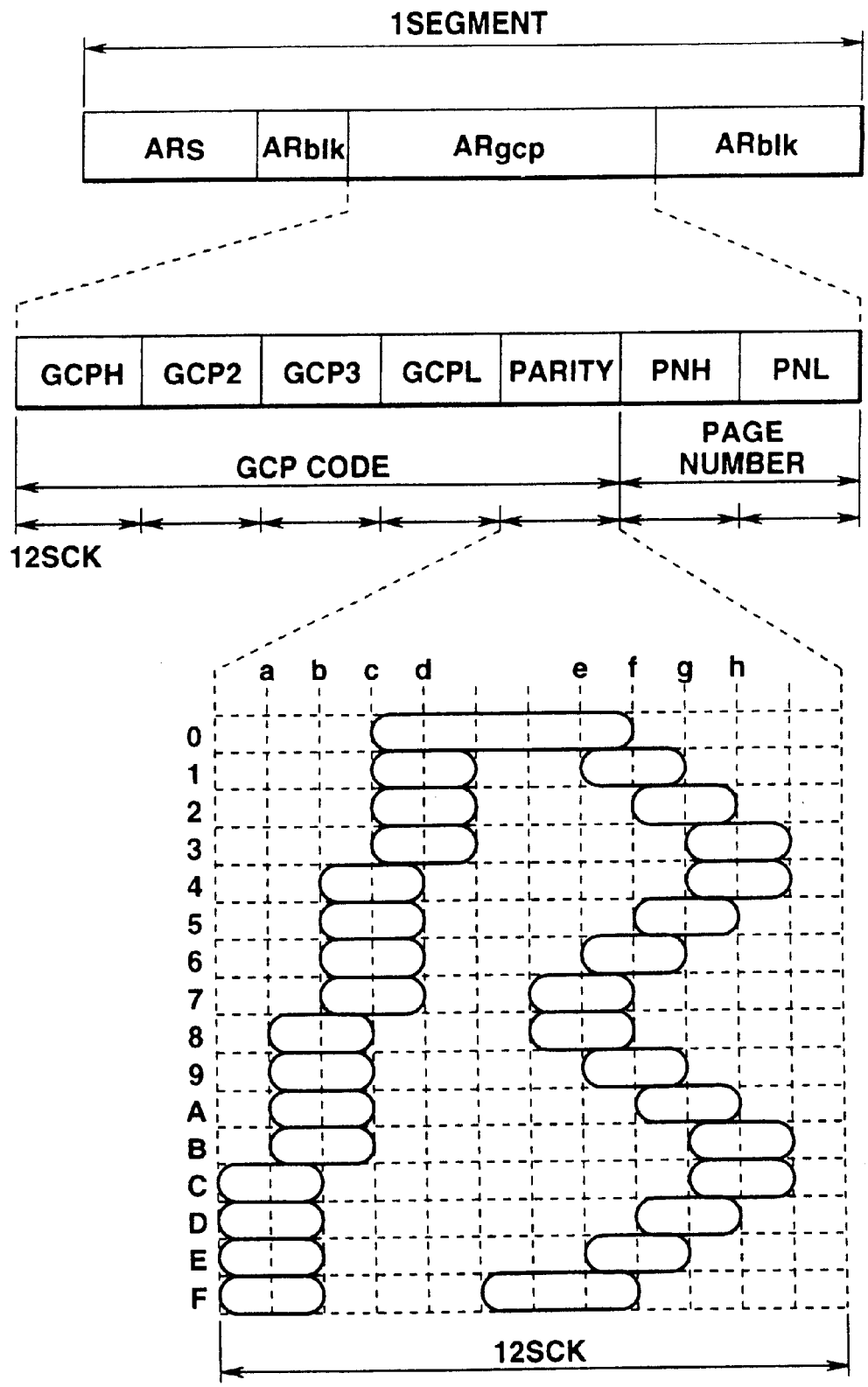
FIG. 17 is a view showing the structure of the GCP segment.

As shown in FIG. 17, the GCP segment GCPseg consists of servo area ARs, GCP area ARgcp and blank ARblk. In the GCP area ARgcp, seven 4 bit data changed into gray code by the same method as the access code ACC of the above-described address segment ASEG, i.e., GCP code consisting of [GCPH3], [GCP2], [GCP3], [GCPL] and its parity [P], and page numbers [PNH], [PNL] are recorded by respectively using emboss pits.

Parity [P] is added to the GCP code so that error correction can be made. Moreover, page numbers [PNH], [PNL] are added so that plural media information, etc. can be given as GCP information. With respect to the page numbers [PNH] and [PNL], in the case up to 16 pages or less, the same information is recorded into [PNH] and [PNL], thereby making it possible to more effectively protect error.

Figure 18:
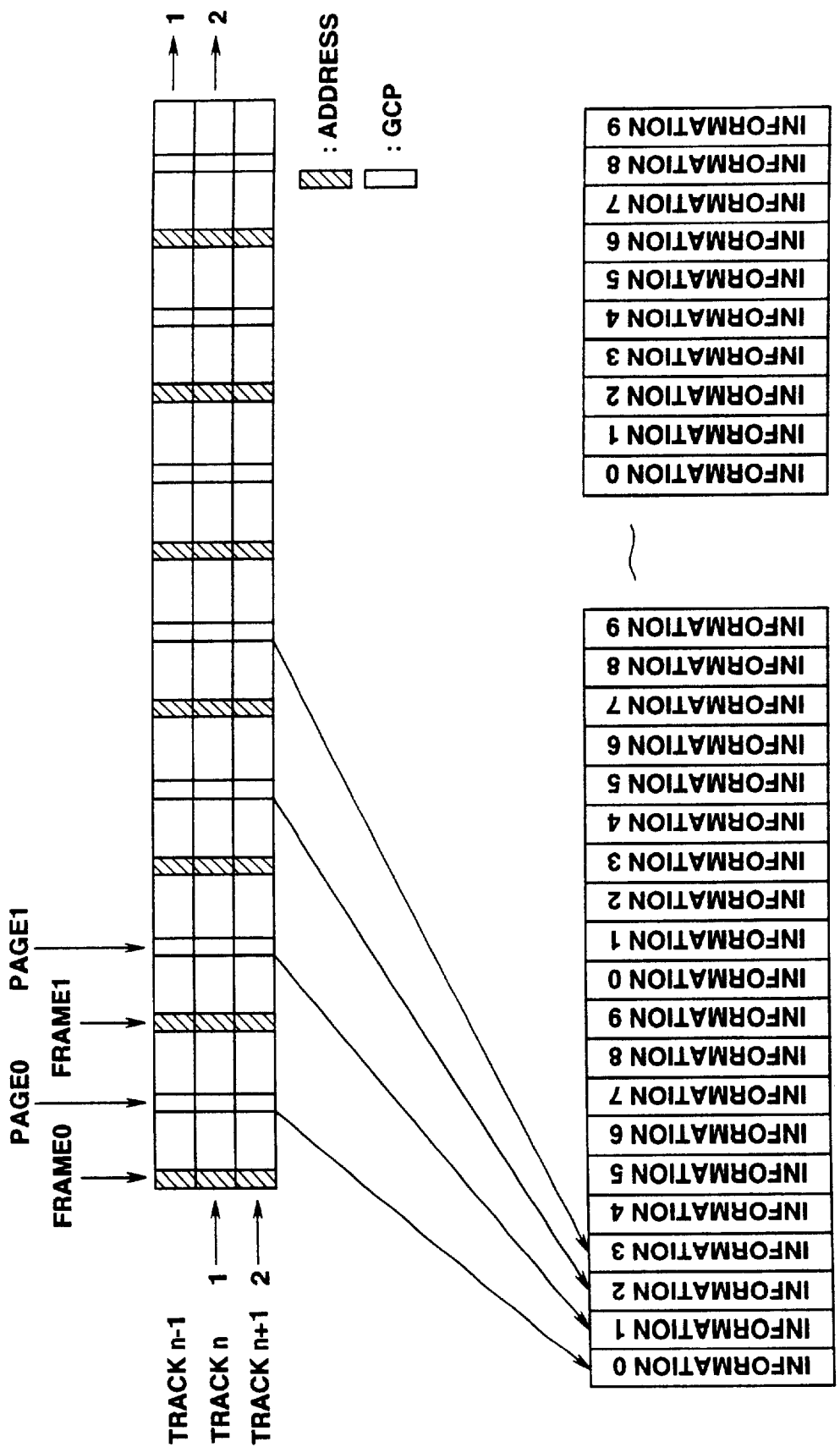
FIG. 18 is a view showing the relationship between page No. to the GCP segment and frame address of address segment in the optical disc.

Moreover, in the GCP area ARgcp, as shown in FIG. 18, an approach is employed to dispose (allocate) respective GCP segments GCPseg in the state where figure of the lower order one digit of address (frame number) recorded in the address segment ASEG and page No. of GCP segment GCPseg are caused to be in correspondence with the each other, thereby making it possible to eliminate error in reading of frame No. of the address segment ASEG and page No. of GCP segment GCPseg. Further, since one circumferential track consists of 100 frames, 10 pages, i.e., ten kinds of GCP information are recorded repeatedly ten times, thereby making it possible to reduce reading error of respective ten kinds of GCP information.

Figure 19:
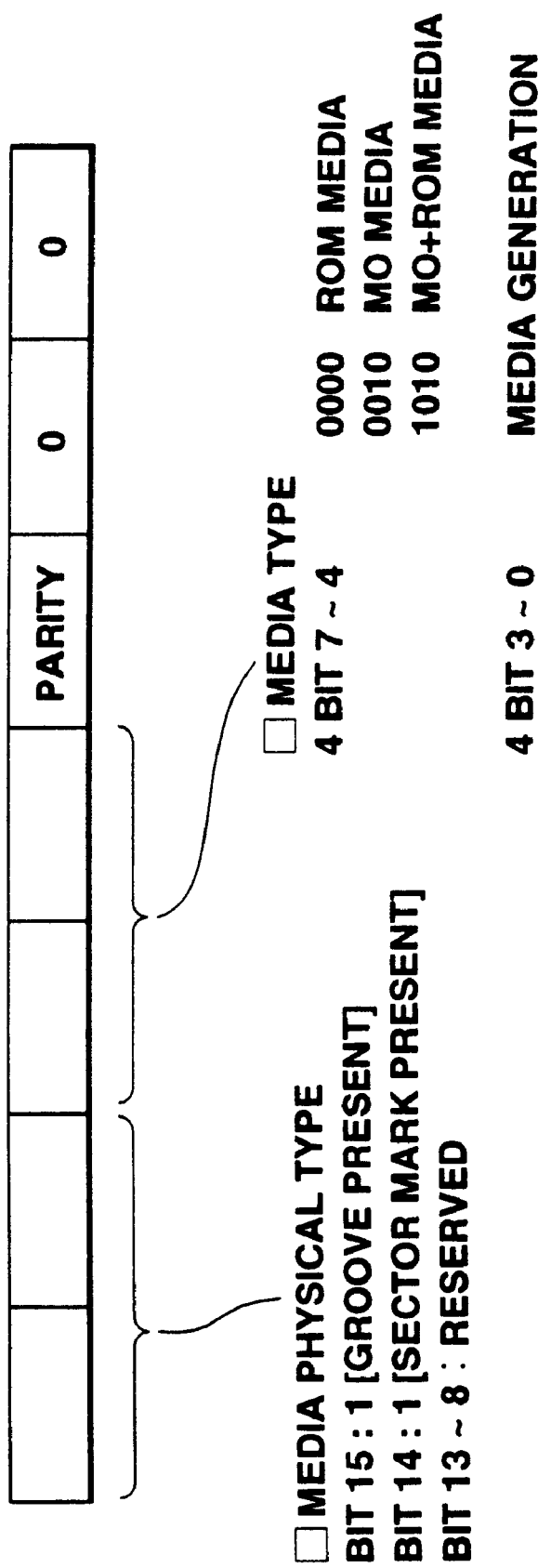
FIG. 19 is a view showing the content of GCP information of page No. 1 of the GCP segment.

Here, the GCP information recorded in the GCP segment GCPseg is as shown in FIG. 19, for example, such that page No. 0 is information indicating media information/media type, wherein information indicating physical type (form) of media such as presence or absence of groove or presence or absence of sector mark, etc. is provided by bits 15~14; information indicating type (form) of media such as MO, ROM, etc. is provided by bits 7~4; and generation information of media is provided by bits 3~0.

Figure 20:
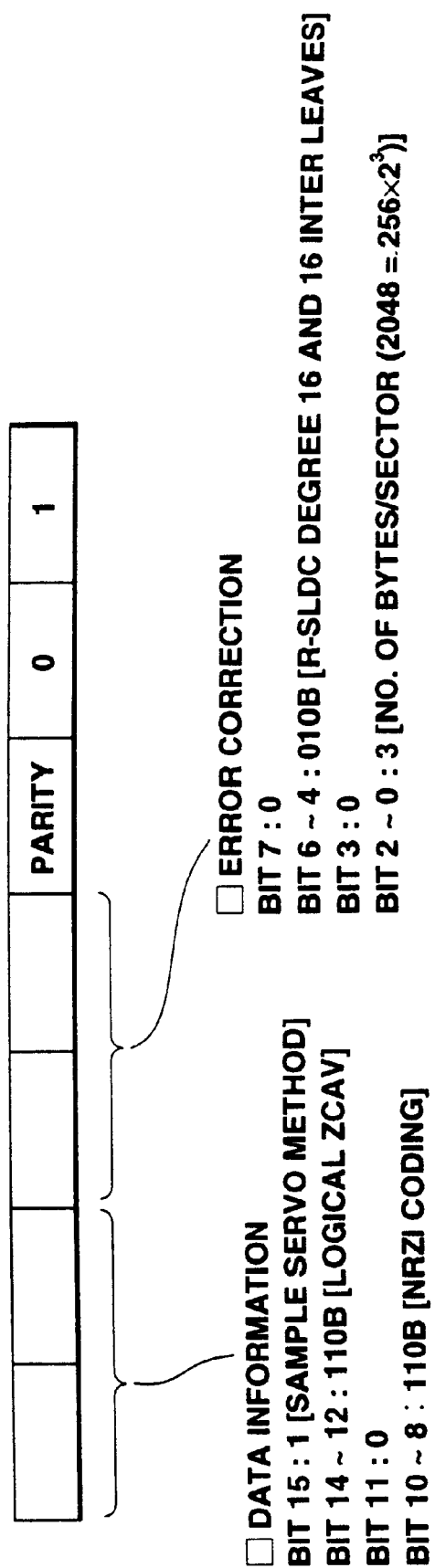
FIG. 20 is a view showing the content of GCP information of page No. 2 of the GCP segment.

Moreover, GCP information of page No. 1 is information indicating data information/error correction type (form) as shown in FIG. 20, wherein data information indicating sample servo system, logical CAV, NRZI coding, etc. is provided by bits 15~8, and information indicating error correction type (form) is provided by bits 7~0.

Figure 21:
FIG. 21 is a view showing the content of GCP information of page No. 3 of the GCP segment.

Further, GCP information of page No. 2 is information indicating outer circumferential SFP track physical address as shown in FIG. 21, wherein information indicating physical address of control track of the outer circumferential side is provided by bits 15~0.

Figure 22:
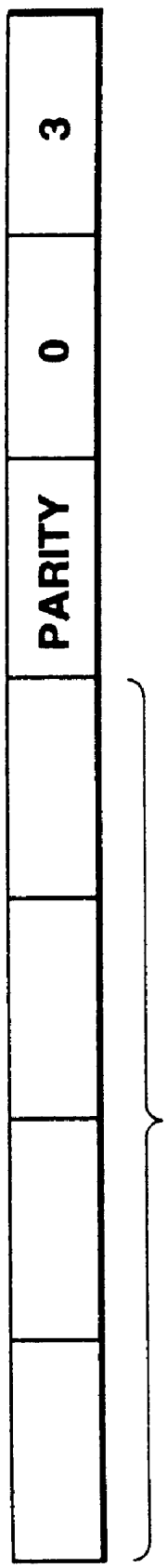
FIG. 22 is a view showing the content of GCP information of page No. 4 of the GCP segment.

Further, GCP information of page No. 3 is information indicating inner circumferential SFP track physical address as shown in FIG. 22, wherein information indicating physical address of control track of the inner circumferential side is provided by bits 15~0.

Figure 23:
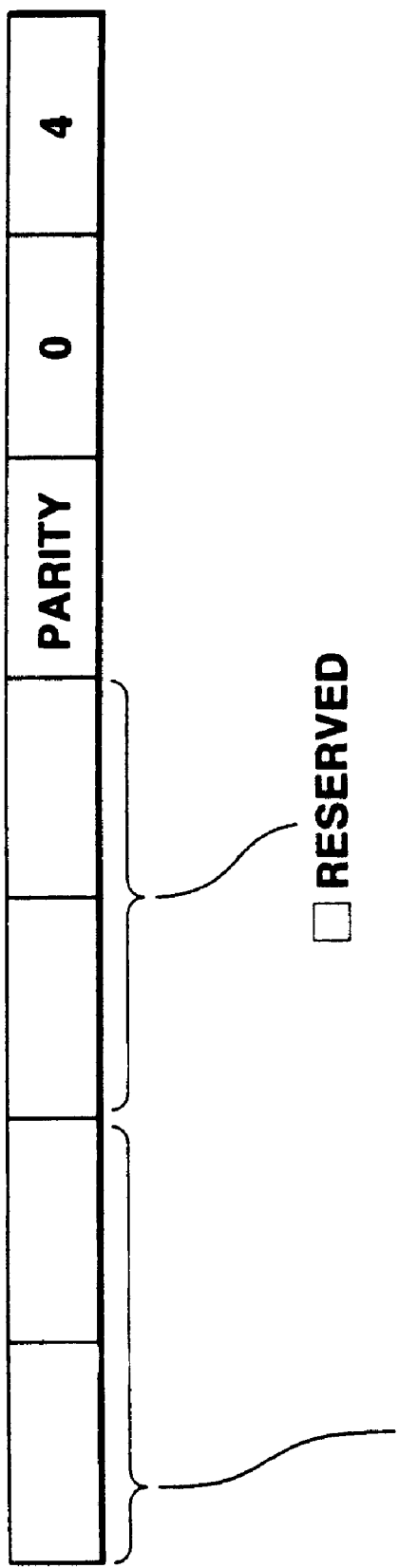
FIG. 23 is a view showing the content of GCP information of page No. 5 of the GCP segment.

Further, GCP information of page No. 4 is information indicating maximum read power as shown in FIG. 23, wherein information indicating maximum read power is provided by bits 15~8. In this example, bits 7~0 are reserved information.

Figure 24:
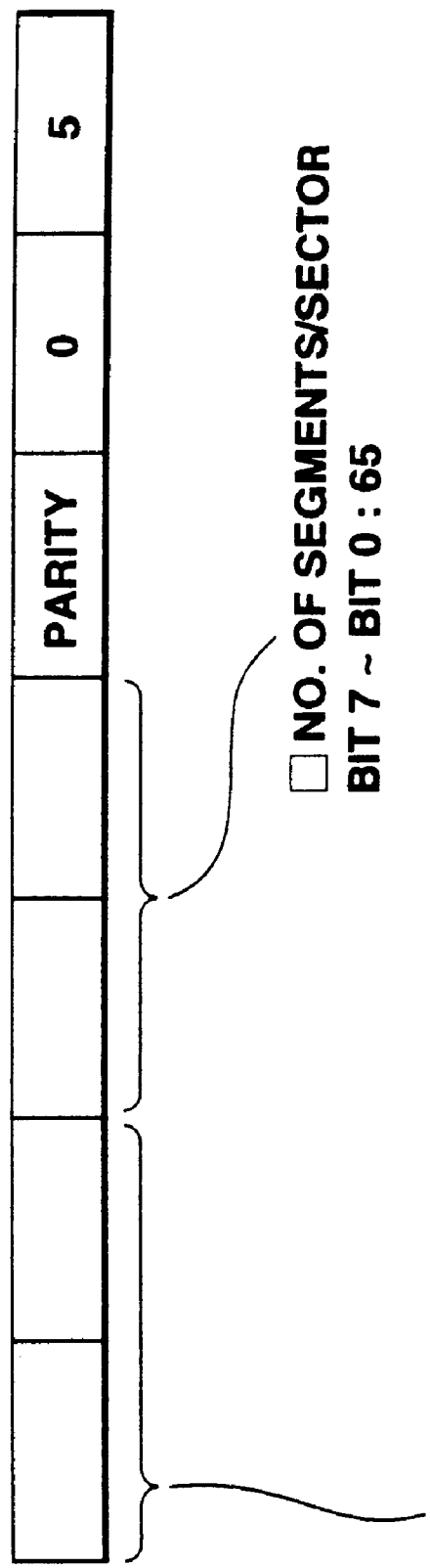
FIG. 24 is a view showing the content of GCP information of page No. 6 of the GCP segment.

Further, GCP information of page No. 5 is information indicating outer circumference control track clock ratio/No. of segments per sector as shown in FIG. 24, wherein information indicating the number of clocks of the outer circumference control track, i.e., value M of clock of FIG. 13 is provided by bits 15~8, and information indicating the number of segments per sector is provided by bits 7~0.

Figure 25:
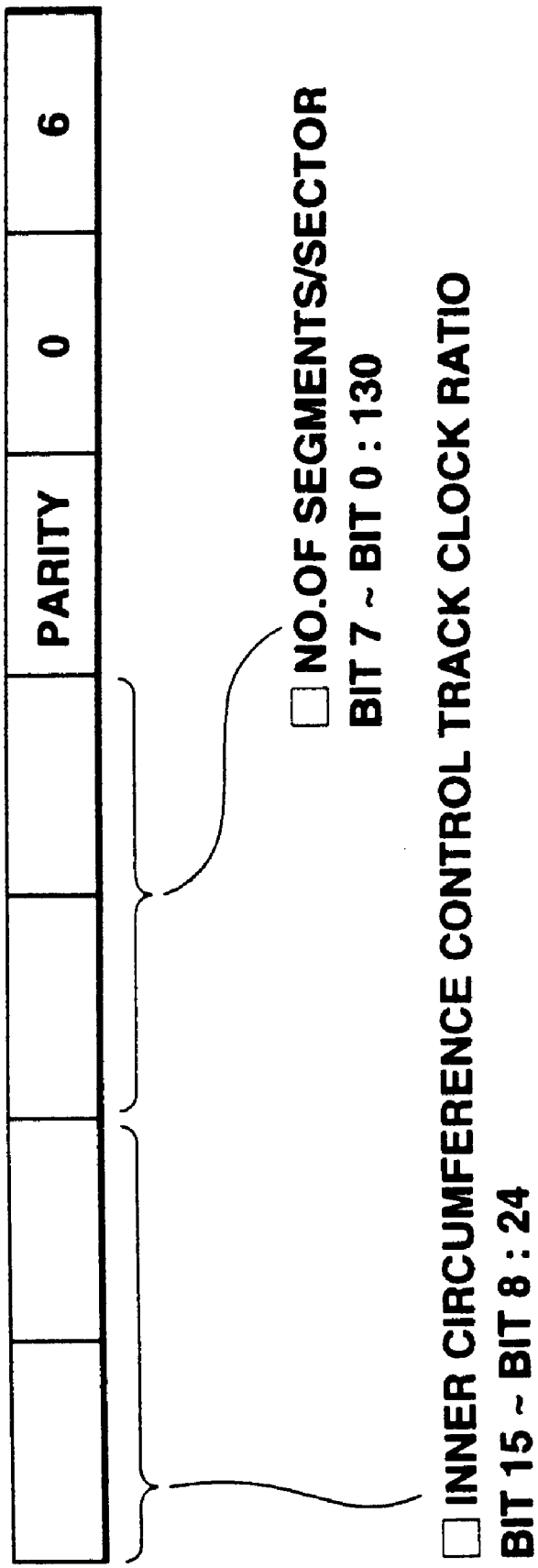
FIG. 25 is a view showing the content of GCP information of page No. 7 of the GCP segment.

Further, GCP information of page No. 6 is information indicating inner circumference control track clock ratio/No. of segments per sector as shown in FIG. 25, wherein information indicating the number of clocks of the inner circumference control track is provided by bits 15~8, and information indicating the number of segments per sector is provided by bits 7~0.

Figure 26:
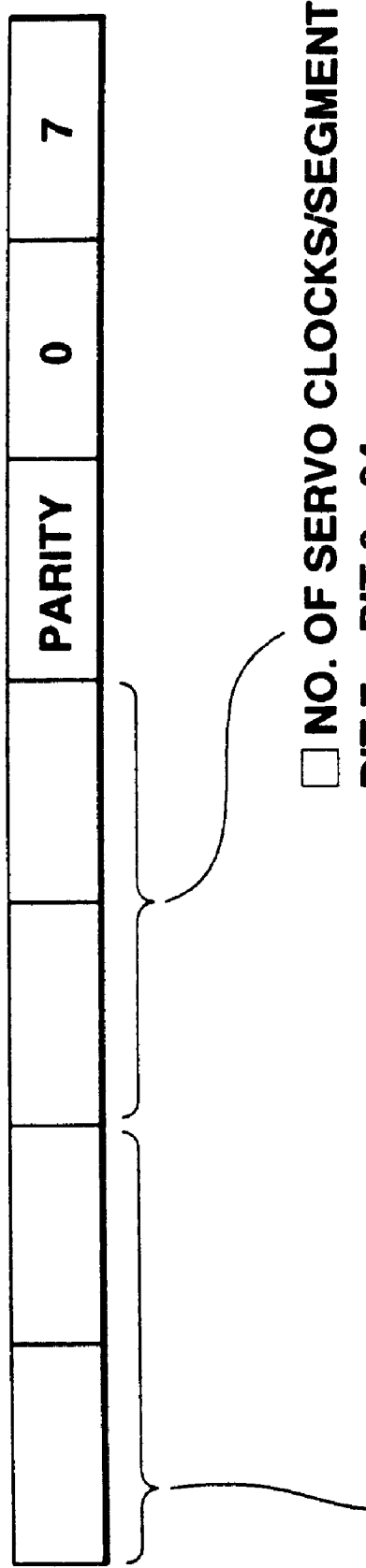
FIG. 26 is a view showing the content of GCP information of page No. 8 of the GCP segment.

Further, GCP information of page No. 7 is information indicating the number of clocks per segment/the number of servo clocks per segment as shown in FIG. 26, wherein information indicating the number of clocks per segment is provided by bits 15~8, and information indicating the number of servo clocks per segment is provided by bits 7~0.

Figure 27:
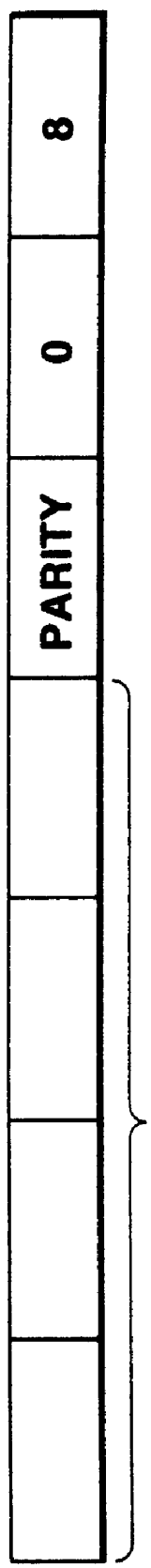
FIG. 27 is a view showing the content of GCP information of page No. 9 of the GCP segment.

Further, GCP information of page No. 8 is information indicating the number of segments per track as shown in FIG. 27, wherein information indicating the number of segments per track is provided by bits 15~0.

Figure 28:
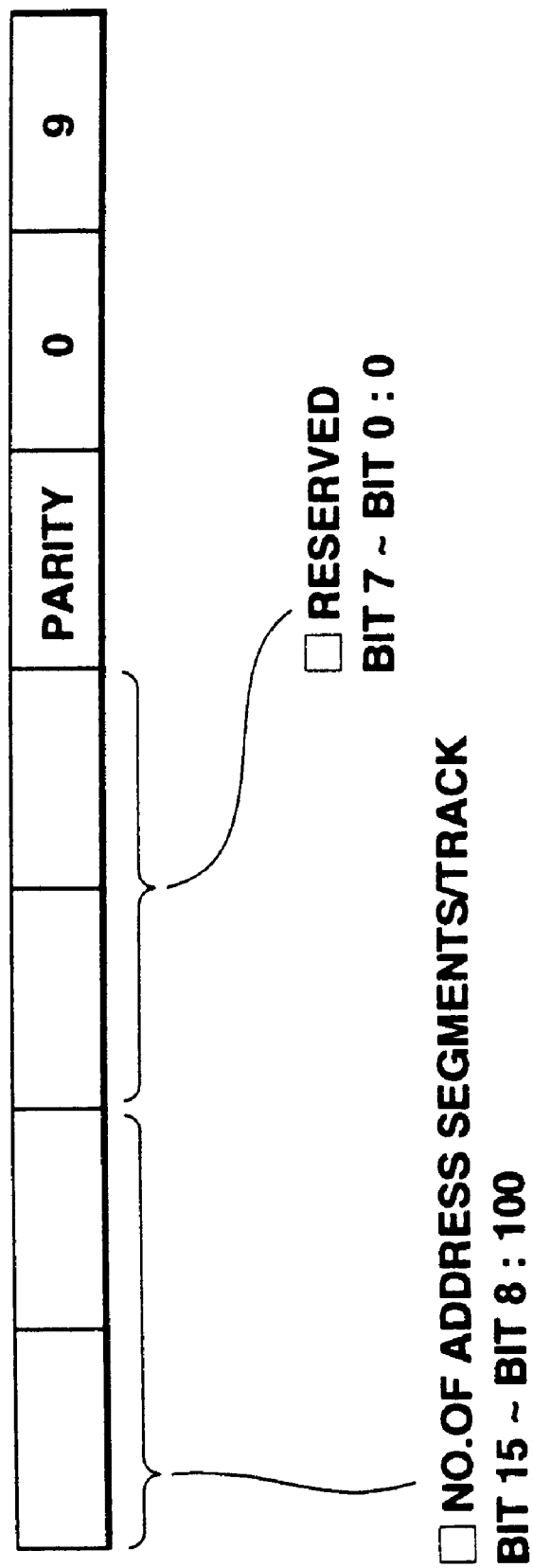
FIG. 28 is a view showing the content of GCP information of page No. 10 of the GCP segment.

In addition, GCP information of page No. 9 is information indicating the number of address segments per track/reserve as shown in FIG. 28, wherein information indicating the number of address segments per track is provided by bits 15~8, and bits 7~0 are reserved information.

On the control track, the above-described GCP information of 20 bytes, media information of 10 bytes such as laser wavelength, reflection factor or track pitch, etc., system information of 70 bytes such as various physical block addresses or the number of bytes of the data field, the number of data clocks of various areas, or the number of zones, etc., band information of 320 bytes such as definition data of respective zones, etc.

Information A indicating the number of segments (1 byte) per track (A=No. of segments/track), information B indicating start track Nos. (2 bytes) of respective zones, information C indicating total number of tracks (2 bytes) of respective zones, and information D indicating the number of segments (1 byte) per sector (D=No. of segments/sector), etc. are recorded on the control track, thereby making it possible to calculate physical track address or physical segment address in a manner as described below from Logical Block Address (LBA) when viewed from, e.g., host computer side.

Namely, physical block address PBA1 converted from logical block address LBA by the conversion table is further converted into zone number E and offset number F to perform an operation as described below from the offset number F $$F \times D/A = G \text{(quotient)} \ldots H \text{(remainder)}$$

to thereby represent the Physical track address and the physical segment address by the following expression Physical track address=$B+G$ Physical segment address=$H$, thus making it possible to calculate the physical track address and the physical segment address within corresponding zone.

In the optical disc of such a structure, address mark ADM and/or respective sector marks STM1, STM2 are recorded within the servo area ARs, thereby making it possible to provide information indicating that corresponding segment is the address segment ASEG or the leading segment of sector without increasing redundancy of the data area ARd. In addition, since the leading data segment DSEG of sector and segment precedent by one are indicated by respective sector marks STM1, STM2, even if one sector mark is brought into defect state, corresponding sector does not defect (bad), thus making it possible to reduce occurrence rate of defect sectors. Moreover, in the above-mentioned optical disc, servo pits having length corresponding to 2 clocks with respect to servo clock SCK generated are recorded within the servo area ARs, thereby making it possible to reduce the mirror portion within the servo area ARs. Thus, ghost pits, etc. taking place at the time of disc molding can be reduced. Further, since interference of data at the time of reproduction can be suppressed by allowing pits to have the pit interval more than the shortest pit width, stable servo signals can be provided. Further, in the above-mentioned optical disc, since scrambled recording data are recorded into the data segment DSEG as NRZI modulated data, recording patterns are randomized. Thus, the possibility that fixed patterns are continuously generated can be lowered. Accordingly, disc molding can be stably carried out, and capacity of memory in the Viterbi decoding of the reproducing unit can be reduced. Further, in the above-mentioned optical disc, since pre-heat time by laser beam can be ensured by prewrite area $AR_{PR}$ and post write area $AR_{PO}$ provided in the data area ARd the data segment DSEG, data recording can be securely carried out in the data area ARd. Further, in the above-mentioned optical disc, since servo information and address information are provided by servo areas ARs and address segments ASEG disposed (allocated) at positions equi-angularly divided, address information can be read, at the reproduction system, by servo clock SCK obtained on the basis of servo information irrespective of recording/reproduction of data. Thus, a stable high speed seek can be made. Further, since plural zones uniform (equal) in the number of sectors respectively have the same data capacities as well, there is no necessity of changing the number of parity sectors or alternative sectors in every zone. Thus, the control software can be simplified. Further, in the above-mentioned optical disc, since the end segment of one zone and the start segment of the next zone are continuous, no useless segment takes place. Further, since start segments of respective zones are disposed (allocated) at the same positions of respective tracks and respective zones start from a segment of the same segment No., management of respective zones can be easily carried out. Further, in the above-mentioned optical disc, since media information changed into gray code by the same format as that of address information recorded in the address segment ASEG is provided by GCP area extending over plural tracks, a decoder for detection of address information can be commonly used without requiring a dedicated decoder for detection of media information at the reproducing unit. Further, at the time of cutting, a special signal generator is not required. In addition, address information also can be read during reading of GCP area at the reproducing unit side. Thus, management of position of the pick-up can be securely made.

Moreover, in the above-mentioned optical disc, media information indicating media kind or format can be provided (delivered) to the reproducing unit by the GCP area. Further, in the above-mentioned optical disc, information for reading information of control track can be provided (delivered) to the reproducing unit by the GCP area. Further, in the above-mentioned optical disc, since media information of the same content are given plural times with respect to one circumferential track by the GCP area, high reliability media information can be provided (delivered) to the reproducing unit. Further, in the above-mentioned optical disc, since respective segments positioned in the radial direction of respective tracks of the GCP area provide media information of the same content, even if no tracking is applied at the reproducing unit side, it is possible to read out media information. In addition, in the above-mentioned optical disc, since the same media information are provided by GCP areas provided in the vicinity of the inner circumferential end and in the vicinity of the outer circumferential end, any one of the inner circumference side access start and the outer circumference side access start can be selected at the reproducing unit.

The optical disc according to this invention is adapted so that user zone is allocated (assigned) to the ROM area and the RAM as shown in FIGS. 29A to 29C and FIGS. 30A to 30C, for example. Allocation of the ROM area and the RAM area is designated every user zone. Position information of respective zones are recorded on the control track shown in FIG. 12, and discrimination information indicating the range of the user zone used as the RAM area and the range of the user zone used as the ROM area are recorded.

Figure 29A:
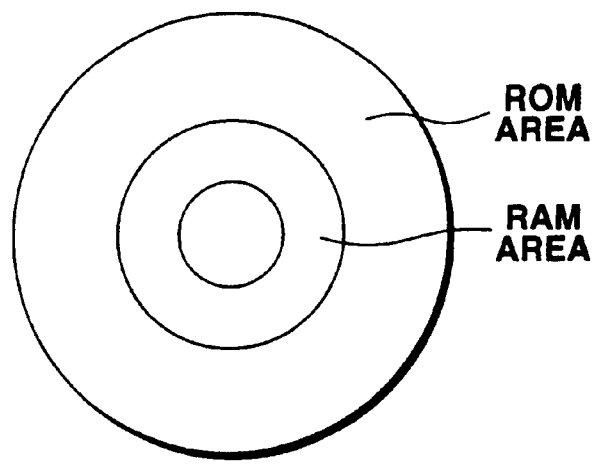
FIGS. 29A–29C are views for explaining arrangement example of RAM area and ROM area in the optical disc.
Figure 29B:
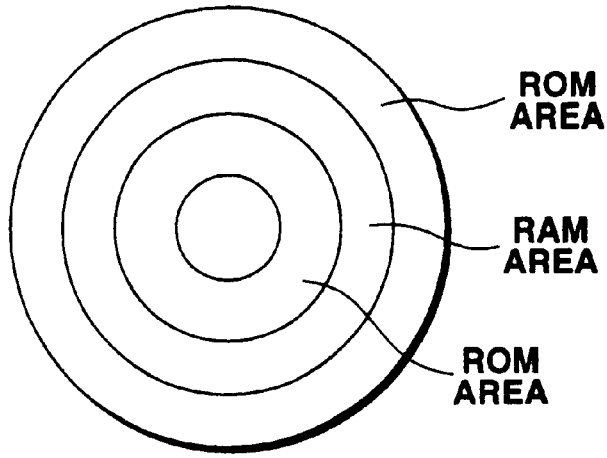
Figure 29C:
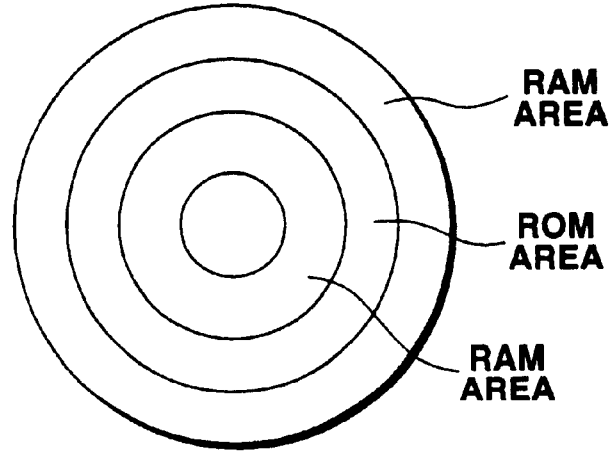

In the optical disc shown in FIG. 29, the user zone is allocated to two areas so that the inner circumferential side and the outer circumferential side are caused to respectively serve as the RAM area and the ROM area. Further, in this optical disc, defect management areas consisting of RAM area for recording defect information indicating defect position on the disc are respectively provided immediately before and immediately after the RAM area as indicated by slanting lines in FIG. 30A. Further, in the optical disc shown in FIG. 29B, the user zone is allocated (assigned) to three areas so that the first ROM area, RAM area, and the second ROM area are disposed in the recited order from the outer circumferential side toward the inner circumferential side. In addition, in the optical disc shown in FIG. 29C, the user zone is allocated (assigned) to three areas. Namely, physical addresses are given (assigned) from the outer circumferential side toward the inner circumferential side, and the first RAM area, the ROM area and the second RAM area are disposed in order recited from the outer circumferential side toward the inner circumferential side.

Figure 30A:
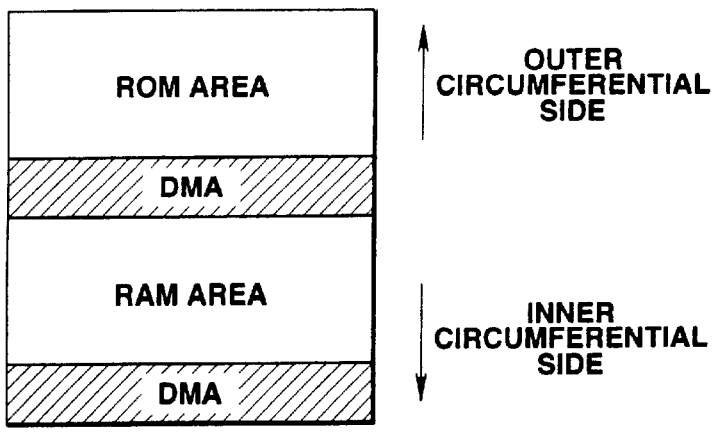
FIGS. 30A–30C are views for explaining arrangement position of defect management area provided in correspondence with the RAM area
Figure 30B:
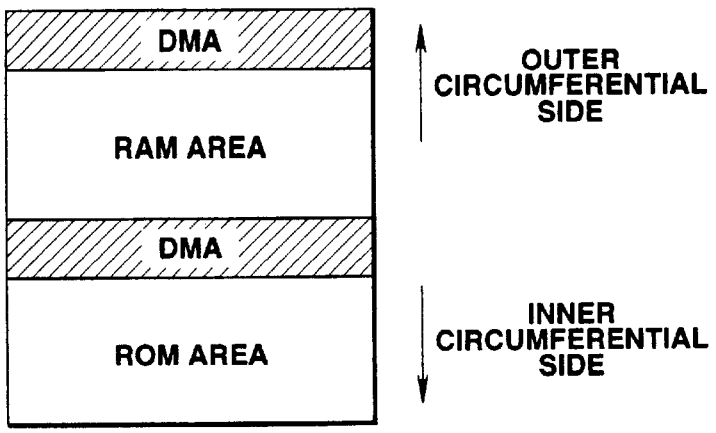

Moreover, in the optical disc shown in FIG. 30B, the user zone is allocated (assigned) to two areas so that the RAM area and the ROM area are disposed in order from the outer circumferential side toward the inner circumferential side. Also in this case, defect management areas are respectively provided immediately before and after the RAM area.

Figure 30C:
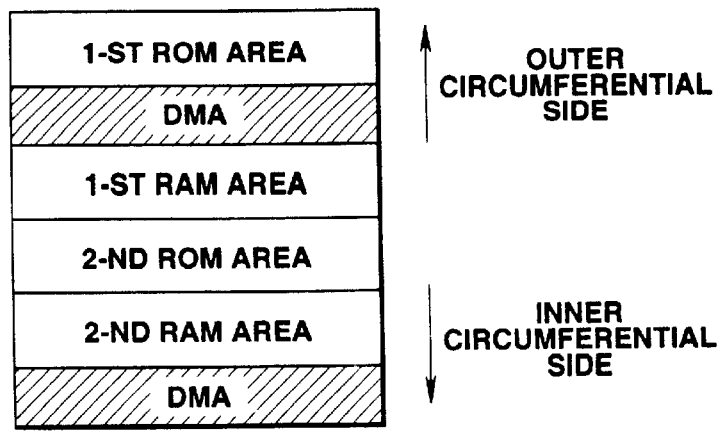

Further, in FIG. 30C, the user zone is further divided into plural ROM areas and RAM areas so that four areas are disposed in order of the first ROM area, the first RAM area, the second ROM area and the second RAM area from the outer circumferential side toward the inner circumferential side. In this case, defect management areas are respectively provided immediately before the first RAM area and immediately after the second RAM AREA.

Figure 31A:
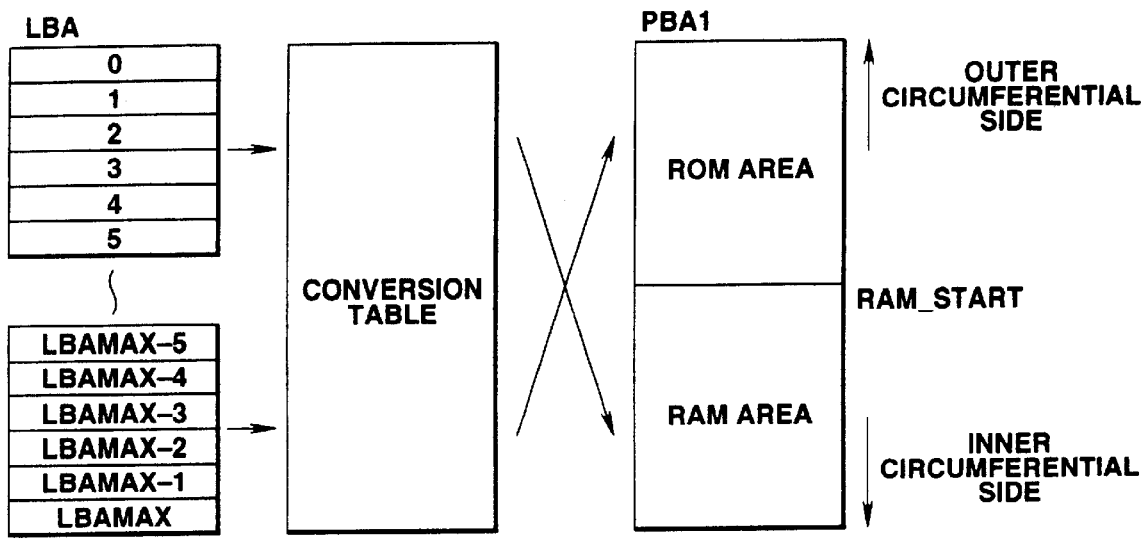
FIGS. 31A–31C are views showing address conversion for allowing logical block address to correspond to the RAM area from the leading portion thereof.
Figure 31B:
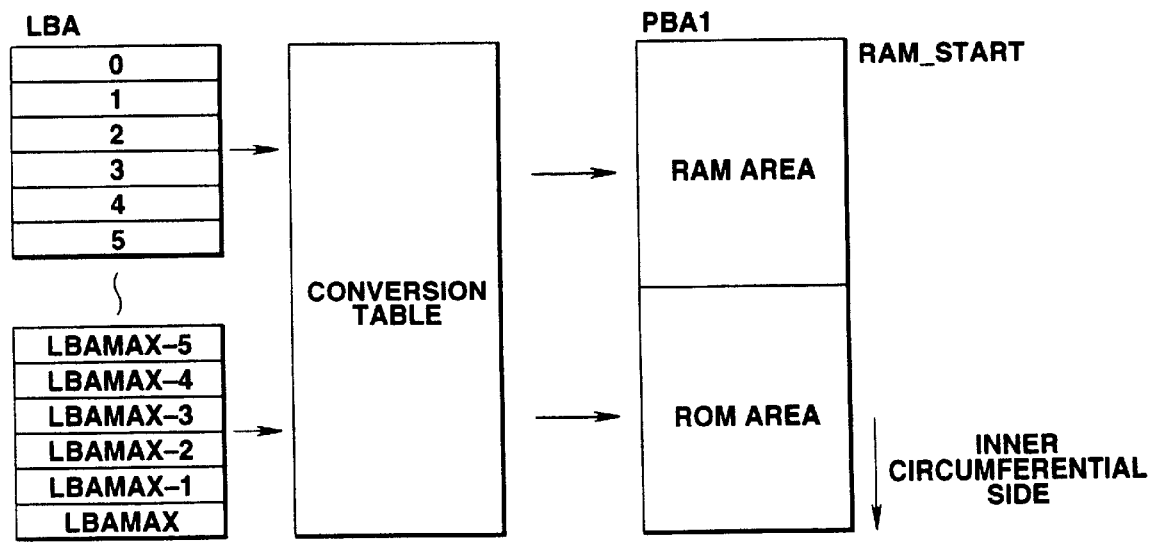
Figure 31C:
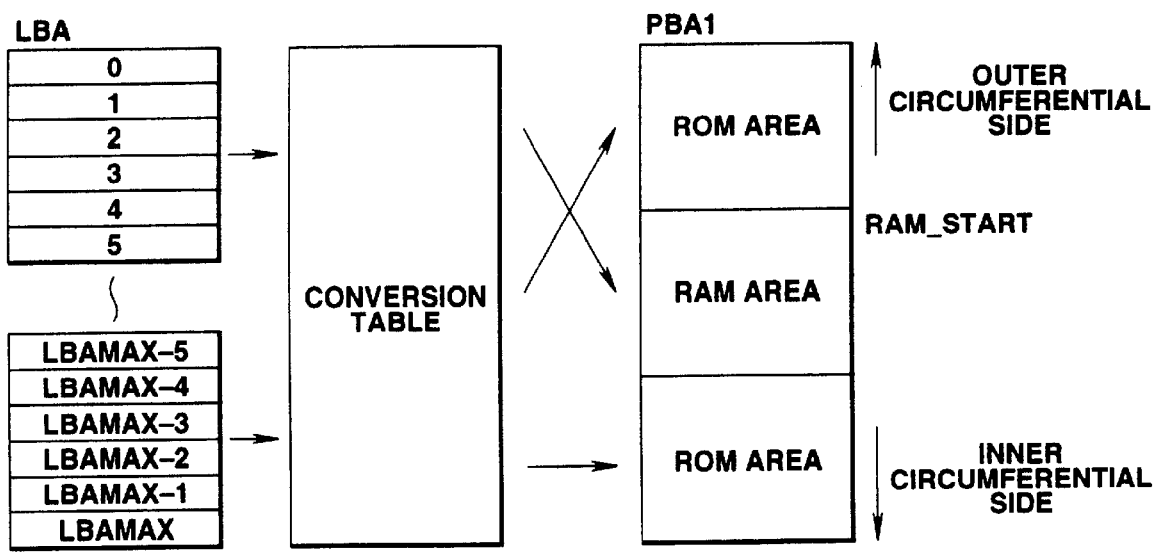

In accessing the optical disc of such a configuration, address conversion is carried out by, e.g., a conversion table, as shown in FIG. 31A to FIG. 31C, for example, so that the leading portion of the logical block address (LBA) when the optical disc is viewed from the host computer side is caused to correspond to the physical block address PBA1 at the leading portion of the RAM area of the outermost circumferential side on the optical disc.

By carrying out address conversion so that the logical block address LBA=0 is caused to correspond to the leading portion of the RAM area in a manner as stated above, it is possible to start reproduction from the leading portion of the RAM area disposed at the inner circumferential side. For this reason, even if the ROM area is disposed at the outer circumferential side, this optical disc is permitted to be used as the boot device. Moreover, since the ROM area can be disposed at the outer circumferential side, the data transfer speed of the ROM area can be high data transfer speed in the optical disc employing the zone CAV system.

Further, in the above-mentioned optical disc, since the defect management areas are respectively provided immediately before the RAM area positioned at the outermost circumferential side and immediately after the RAM area positioned at the innermost circumferential side, the interval (distance) between these two defect management areas can be shortened. As a result, seek time in writing DMA information extending over the two defect management areas is reduced, thus permitting the access speed to be high. In addition, the buffer area between the user area serving as the RAM area and the ROM area and the defect management area is omitted, thereby making it possible to increase the memory capacity accordingly.

Figure 32:
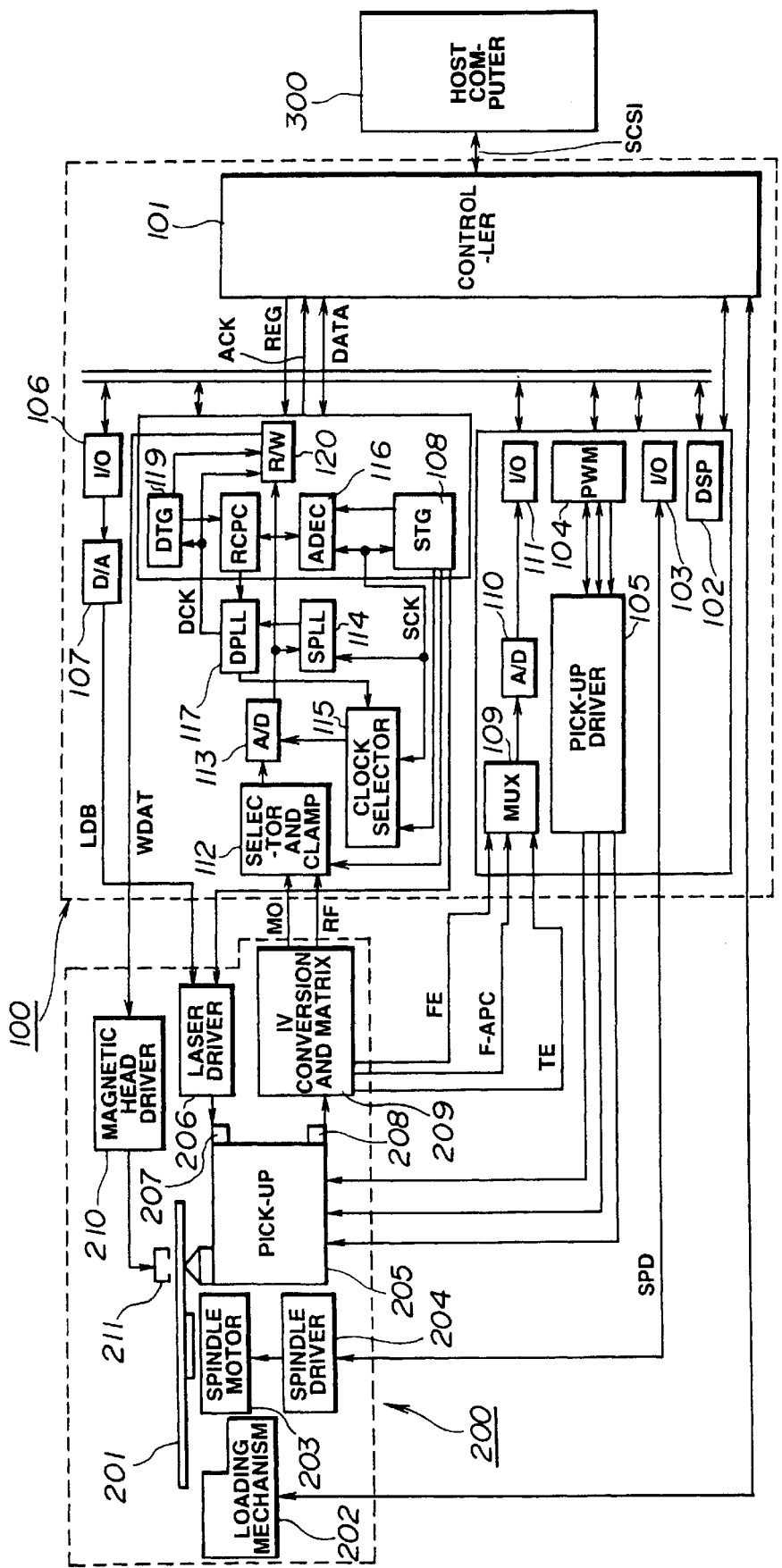
FIG. 32 is a block diagram showing the configuration of an optical disc drive apparatus according to this invention.

A recording/reproducing apparatus using, as a recording medium, the optical disc of such a format, i.e., an optical disc drive unit is composed of a control circuit block 100 and a disc drive 200 as shown in FIG. 32, for example. The fundamental configuration of the disc drive unit shown in FIG. 32 is the same as that disclosed in U.S. Pat. No. 5,436,770. In this optical disc drive unit, transmission/reception of commands and data are carried out between the optical disc drive unit and a host computer 300 connected through SCSI interface.

The processing for transmission/reception of commands and data is carried out by a controller 101 of the control circuit block 100. The controller 101 is operative to add, at the time of recording, CRC and/or error correction code, etc. to data from the computer 300 to deliver it to the disc drive 200, and to carry out, at the time of reproduction, error correction with respect to data from the disc drive 200 to transfer the user data portion to the host computer 300. Further, instructions with respect to the servo system and respective blocks of the disc drive 200 are given by a digital signal processing circuit (DSP) 102 which carries out necessary processing with respect to commands from the controller 101.

In this optical disc drive unit, the DSP 102 instructs, through an I/O block 103, a spindle driver 204 to rotationally drive a spindle motor 203 in accordance with request from the host computer 300 in the state where an optical disc 201 is loaded into the spindle motor 203 by a loading mechanism 202, or when the optical disc 201 is loaded, in the case where the automatic spin up mode is set. When the rotation number of the spindle motor 203 reaches a predetermined value, the spindle driver 204 outputs spindle ON/OFF signal SPD to inform the DSP 102 that the rotation is stabilized. Moreover, for this time period, the DSP 102 allows a beam spot to be positioned in the recording area, i.e., e.g., GCP area except for the zones 0~15. When pull-in of focus is carried in the recording area there is the possibility that data may be erroneously erased in the case of high, sensitivity magneto-optical disc. However, when pull-in of focus is carried out in the area where data are formed by emboss pit of, e.g., the above-described GCP area except for the recording area, erroneous erasing of data is prevented.

Here, the DSP 102 can discriminate on the basis of media information reproduced from the GCP area whether the optical disc 201 is a reproduction only optical disc, re-recordable magneto-optical disc, or hybrid optical disc including the ROM area and the RAM area. Since media information changed into gray code by the same format as that of address information is recorded in the GCP area, it is possible to read the address information and the media information by the same method to discriminate therebetween. In addition, since media information changed into gray code are recorded in the GCP areas of plural tracks, media information can be securely read even if position control of beam spot is not correct.

When the rotation number of the spindle motor 203 becomes equal to a predetermined value so that a pick-up 205 is moved to, e.g., the portion in the vicinity of the outer circumferential end, the DSP 102 sets bias current LDB of a laser diode 207 provided at the pick-up 205 with respect to a laser driver 206 through a D/A converter 107 from an I/O block 106 to-issue (output) command to a servo system timing generator (STG) 108 which controls ON/OFF of the laser diode 207 so that it emits laser beams. This bias current LDB is caused to be at high level at the time of recording and is caused to be at low level at the time of reproduction. When laser beams are emitted from the laser diode 207, those laser beams are incident to a photodetector 208 provided at the pick-up 205. A detection output by the photodetector 208 is inputted to a multiplexer 109 as a front APC signal F-APC converted into voltage by I-V conversion block through a current/voltage (I-V) conversion & matrix amplifier 209.

This front APC signal F-APC is digitized by an A/D converter 110 as a signal selected in a time divisional manner by the multiplexer 109, and is inputted to the DSP 102 through an I/O block 111. The DSP 102 recognizes light quantity of the laser beams by the digitized front APC signal F-APC to vary bias current LDB on the basis of light quantity control data calculated by the digital filter included therewithin to thereby conduct a control so that quantity of light emitted from the laser diode 207 becomes constant.

Then, the DSP 102 allows current to flow in the focus driver of a pick-up driver 105 from a PWM circuit 104 to thereby drive, in upper and lower directions, the focus actuator of the pick-up 205 to allow it to be placed in focus search state. At this time, laser beams reflected from the optical disc 201 are detected by the photodetector 208. A detection output by the photodetector 208 is converted into voltage by I-V conversion block of the I-V conversion & matrix amplifier 209, and is inputted to the multiplexer 109 as a focus error signal FE through matrix amplifier.

This focus error signal FE is digitized by the A/D converter 110 as a signal selected in a time divisional manner by the multiplexer 109 similarly to the front APC signal F-APC, and is inputted to the DSP 102 through the I/O block 111. The DSP 102 feeds focus control data obtained by carrying out filtering, in a digital manner, with respect to digitized focus error signal FE from the PWM circuit 104 back to the focus driver of the pick-up driver 105 to thereby constitute servo loop for focus control. When the focus control becomes stable, the amplitude of RF signal (the time of the ROM area) or MO signal (the time of data area of the RAM area) from the above-described prewrite area $AR_{PR}$ obtained by the I-V conversion & matrix amplifier 209 from the detection output by the photodetector 208 becomes constant to some degree. Then, the RF signal or the MO signal is clamped by a selector & clamp 112 so that it has a suitable potential, and is then caused to undergo A/D conversion by an A/D converter 113. By carrying out clamp operation by making use of the prewrite area $AR_{PR}$, a stable signal is obtained. Thus, precise clamp operation can be carried out.

The A/D converter 113 is selectively supplied, through a clock selector 115, servo clock signal SCK from a servo system clock generating (SPLL) circuit 114 and data clock signal DCK from a data clock generating (DPLL) circuit 117. The clock selector 115 is controlled by a servo system timing generator (STG) 108 so as to select servo clock signal SCK with respect to reproduction RF signal from the servo area, and to select data clock signal DCK with respect to reproduction RF signal from the data area.

Clock at the time of pull-in operation of servo becomes a frequency in the free run state of the servo system clock generating (SPLL) circuit 114. Also as the timing pulse of clamping, a signal obtained by frequency-dividing the servo clock signal SCK of the free run frequency by a predetermined value is used.

Figure 33:
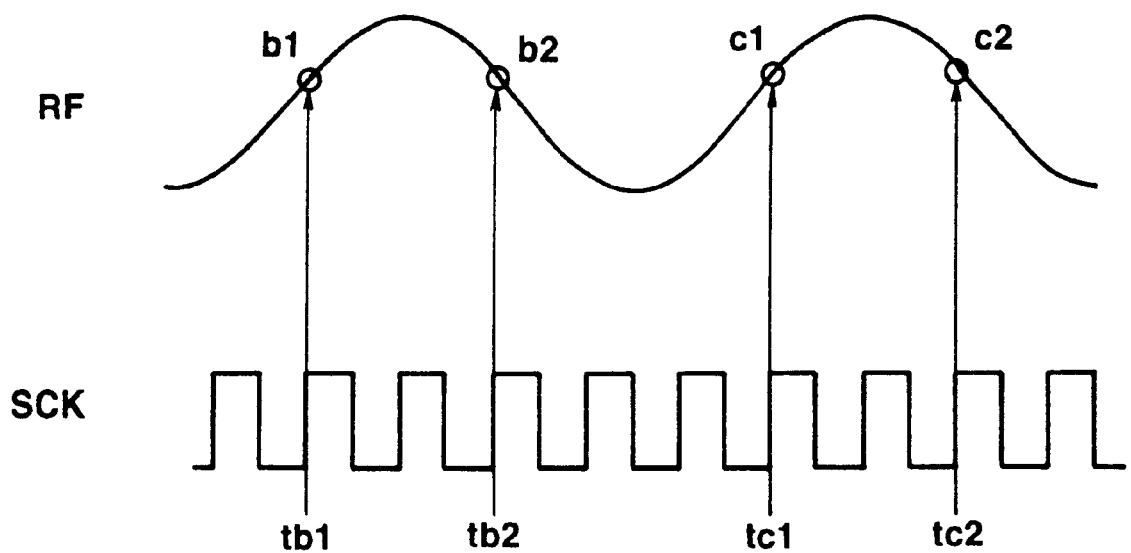
FIG. 33 is a timing chart showing sampling timing for taking out clock information from reproduction RF signal waveform of wobble pit in the optical disc drive apparatus.

The SPLL circuit 114 observes (recognizes) amplitude difference of the RF signal digitized by the A/D converter 113 to thereby check pattern of emboss pits to search for the same pattern as the pit train of the servo area determined in advance. When a corresponding pattern is found, the SPLL circuit 114 opens the window at the timing where the next pattern should appear, i.e., in the servo area of the next frame to confirm whether or not patterns are in correspondence with each other for a second time. When such an operation is continuously confirmed predetermined number of times, it is considered that the phase of servo clock SCK that the SPLL circuit 114 generates is locked with respect to the phase of rotation of the optical disc. Here, as shown in FIG. 33, for example, an operation expressed below is performed.

phase error data=$[(b2-b1)+(c2-c1)]/2$ from sampling data b1, b2 of sampling points of first and last transition spaced in point of time by one servo clock before and after the central point of reproduction RF signal waveform with respect to wobble pit Pb sampled at respective timings $t_{b1}$, $t_{b2}$ of the servo clock SCK; and sampling data C1, C2 of sampling points of first and last transition spaced in point of time by one servo clock before and after the central point of reproduction RF signal waveform with respect to wobble pit PC sampled at respective timings $t_{c1}$, $t_{c2}$ of the servo clock SCK, thereby making it possible to detect phase error between the servo clock SCK and servo data. As stated above, phase information is obtained by taking the difference between amplitudes of first and last transition of wobble pits Pb, Pc within the servo area. Further, phase information obtained from both wobble pits are added to thereby absorb gain fluctuation (change) taking place from amplitude change by tracking position.

Since the optical disc drive unit can recognize the scanning position of the pick-up 205 of the segment unit when the SPLL circuit 114 is locked, it can also recognize the position of the first pit Pa. Thus, this drive unit is operative to open the window at the above-described four positions A, B, C, D shown in FIG. 4 to search for the position where there is a maximum amplitude among RF signals sampled at these four positions A, B, C, D. When its result is the position A, it can be recognized that corresponding position information (pit position) is address mark ADM, and corresponding segment is address segment and the leading portion of frame. Accordingly, frame counter (not shown) included within the unit is cleared, thus making it possible to take frame synchronization. Since one frame has 14 segments, the window is opened every 14 segments to judge that the frame synchronization has been locked when position information can be continuously recognized as the address mark.

Since the position where the address is recorded can be recognized when the frame synchronization is established, decode operations of the access code ACC and the frame code FRC are carried out by an address decoder (ADEC) 116. The ADEC 116 decodes the pattern changed into gray code by 4 bits by observing (recognizing) correspondence with the above-described gray code table shown in FIG. 5. Here, the ADEC 116 samples reproduction RF signals of respective positions a, b, c, d shown in FIG. 5 to determine, by the difference maximum value detection method (differential detection method), the position where the amplitude value becomes maximum. Similarly, the ADEC 116 samples reproduction RF signals of respective positions e, f, g, h shown in FIG. 5 to determine the position where the amplitude value thereof becomes maximum to carry out decode operation by combination of these positions and the gray code table. By the above-mentioned method, track address [AM]–[AL], parity [P], frame addresses [FM], [FL] are decoded to store the decoded result into the register. The DSP 102 reads out the decoded result stored in this register when these data are established, thereby making it possible to detect current position of the pick-up 205. It is to be noted that since only four bits are not changed into gray code, but the entirety is changed into gray code, comparison with inverted or non-inverted table is carried out depending upon whether LSB of the higher order 4 bits is a "1" or a "0" without simply examining correspondence therebetween. Here, it is assumed that when frame code FRC first decoded is loaded into the frame counter to make a comparison between the numeric value obtained by incrementing the frame counter every frame and frame code FRC actually reproduced to confirm that they are continuously in correspondence with each other, the rotation synchronization has been established. At subsequent times, the numeric value obtained by the frame counter is fed back to the DSP 102 as a frame code FRC to thereby eliminate erroneous recognition of frame position even if a defect, etc. somewhat exists.

Moreover, the ADEC 116 decodes GCP information by the method similar to the track address and the frame code FRC. It is to be noted that the decoded result stored in the register is read out by GCP segment GCPseg where GCP information is recorded without use of address segment, thereby making it possible to confirm the content of the GCP area ARgcp.

Further, the DSP 102 calculates, at the time of seek, movement speed of the pick-up 205 while reading the previous track address changed into gray code to control the slide motor of the pick-up 205 through the slide driver of the pick-up driver 105 from the PWM circuit 104 to thereby move the pick-up 205 to the target (objective) track.

When the pick-up 205 reaches the target track, the operation enters the tracking operation. As described above, the tracking error signal TE is obtained by taking difference between amplitude values of RF signals reproduced from two wobble pits present in the servo area. The DSP 102 feeds tracking control data obtained by implementing, in a digital manner, filtering to the value from the PWM circuit 104 back to the pick-up driver 105 to thereby constitute servo loop for tracking control.

Then, the leading position of the target sector is detected in the state where cracking is applied.

As described above, at segments serving as the leading portions of respective sectors and segments preceding by one, sector marks STM1, STM2 are present. Respective sector marks STM1, STM2 indicate leading segment of the sector when the window is opened at the above-described four positions A, B, C, D shown in FIG. 4 and the position where RF signal takes maximum amplitude of RF signals sampled at these four positions A, B, C, D is B, and indicate segment preceding by one of the leading portion of the sector when the maximum amplitude position is C. Basically, the segment serving as the leading portion of the sector is determined by converting sector address given by the host computer 300 into the physical sector to calculate the position of segment on the track where corresponding sector exists. In this case, the probability that the two kinds of sector marks become defect at the same time is less than $10^{-10}$ from an empirical point of view. Accordingly, occurrence probability of defect sector resulting therefrom is extremely small.

Moreover, the data clock generating (DPLL) circuit 117 generates data clock DCK obtained by multiplying servo clock to which frame synchronization is applied obtained by the SPLL circuit 114 by MIN to deliver this data clock DCK to a data system timing generator (DTG) 119 or a recording/reproduction circuit 120.

In this case, N is equal to 16, and M changes within the range from 16 to 32 in dependency upon the user zone. Since the angular velocity of rotation of the disc is constant irrespective of the zone, data transfer rate becomes higher according as the position of the zone shifts to the outer circumferential side of the disc.

The data clock DCK generated by the data clock generating (DPLL) circuit 117 is caused to undergo phase compensation by a read clock phase compensation (RCPC) circuit 121 on the basis of phase in the read clock phase compensation area for reproduction RF signal of the above-described reference data shown in FIG. 11.

At the time of the recording operation mode, user data to be recorded is delivered from the host computer 300 to the recording/reproduction circuit 120 through the controller 101.

The recording/reproduction circuit 120 adds (EXOR), e.g., random number of 127 periods to the recording data to thereby carry out, in sector units, scramble processing in accordance with $Y=X^7+X+1$. Then, the recording/reproduction circuit 120 modulates the user data thus scrambled into data of the NRZI series synchronous with the data clock DCK. At this time, initial values are set to "0" every respective segments. Then, the recording/reproduction circuit 120 delivers the modulated signal WDAT to a magnetic head 211 through a magnetic head driver 210. The magnetic head 211 produces a magnetic field corresponding to the modulated signal WDAT to apply this magnetic field to the data area ARd of the magneto-optical disc 201 heated up to the Curie temperature by laser beams that the laser diode 207 emits to thereby record data of the NRZI series.

It is to be noted that the laser driver 206 is controlled by the servo system timing generator (STG) 108 so that the drive mode of the laser diode 207 is switched from the reproduction drive power to the recording drive power at the timing where the pick-up 205 is moved from the servo area to the pre-write area of the data area. Then, the recording reproduction circuit 120 is controlled by the data system timing generator (DTG) 119 so that data of specific polarity is recorded into the pre-write area $AR_{PR}$ at the timing where the pick-up 205 has been passed through the pre-write area $AR_{PR}$. It is to be noted that the data of specific polarity is data having the same polarity as that of bulk erase of the pre-write area $AR_{PR}$. When data having the same polarity as the bulk erase direction is recorded into the pre-write area $AR_{PR}$ in a manner as stated above, even if data fails to be normally recorded into the pre-write area ARPR because of insufficient pre-heat of media, recorded data does not change. Accordingly, stable signals can be reproduced.

At the time of reproducing operation mode, reproduction signal obtained by the I-V conversion & matrix amplifier 209 from a detection output by the photodetector 208 is clamped by a selector & clamp 112 so that it has a suitable potential, and is then caused to undergo A/D conversion by the A/D converter 113. The reproduction signal thus obtained is delivered to the recording/reproduction circuit 120. Then, the recording/reproduction circuit 210 implements digital filtering to become in correspondence with the partial response (1,1) with respect to the reproduction signal digitized by the A/D converter 113 thereafter to decode data of the NRZI series by the Viterbi decoding. Then, the recording/reproduction circuit 210 converts, in segment units, the data of the NRZI series into data of the NRZ series thereafter to de-scramble it in sector units to thereby convert it into reproduction data. Then, the recording/reproduction circuit 210 transfers the reproduction data to the host computer 300 through the controller 101.

It is to be noted that the Japanese Patent Application Laid Open No. 5-225638, corresponding to U.S. patent application Ser. No. 08/014,112, now U.S. Pat. No. 5,363,352 has been already filed by the applicant of this invention in connection with the magneto-optical disc apparatus using the partial response (1, 1) and the Viterbi decoding.

By implementing scrambling (processing) to recording data in this way, data patterns are randomized. As a result, the probability that data trains where values cannot be definite are successive in the Viterbi decoding becomes small. Thus, capacity of the memory for the Viterbi decoding can be reduced. In addition, since pit arrangement is randomized in the case of the ROM disc, ratio between presence and absence of emboss pits on the disc becomes closer to 50%. As a result, molding of the disc is facilitated.

Figure 34:
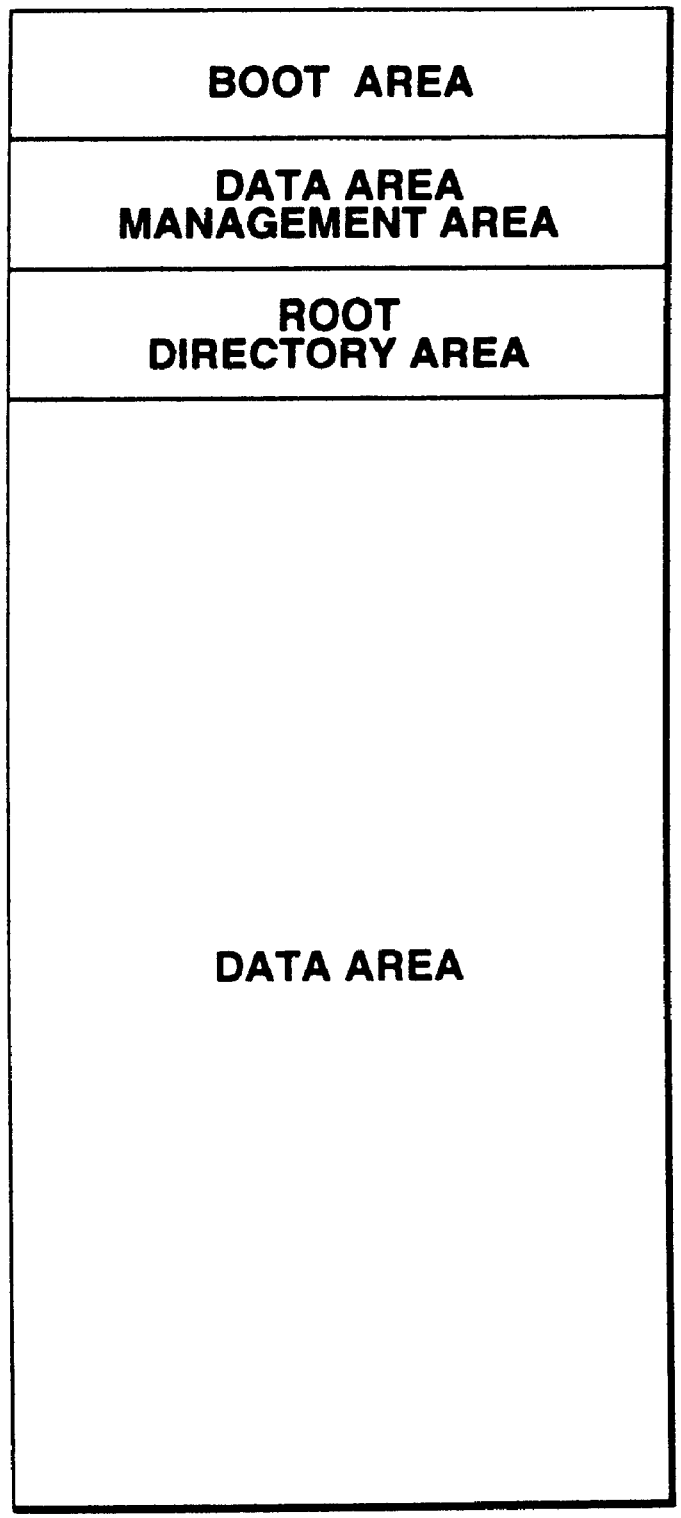
FIG. 34 is a view for explaining a general disc management method in the optical disc drive apparatus.

Here, the controller 101 in this optical disc drive unit carries out disc management on the basis of information of the disc management area consisting of a boot area, a data area management area, and a root directory area as shown in FIG. 34.

Figure 35:
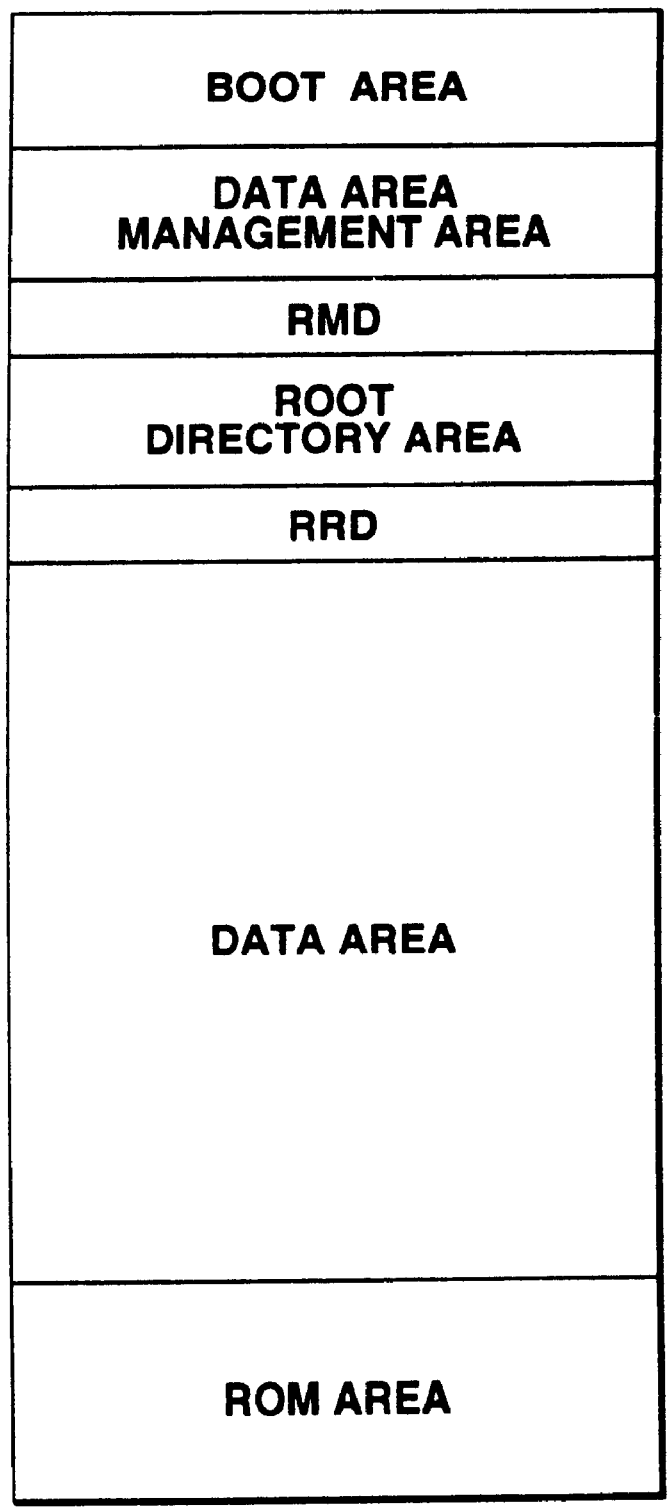
FIG. 35 is a view for explaining a disc management method for optical disc of the hybrid type in the optical disc drive apparatus.

The boot area is the area for reading OS (Operating System) included in the data area to carry out starting of the system, and boot data different for every kind of host computer are included therein. Moreover, the data area management area is the area for carrying out management of used (already used) area and unused (not yet used) area of the data area, and management data is rewritten every time the rewrite operation of data is carried out. Further, the root directory area is the area for containing (storing) file information included within the root directory. If the file name contained (stored) within the root directory is rewritten, or increased, data can be rewritten. Further, the data area is the area where the content of the file and/or subdirectory information are contained (stored). In the optical disc of the hybrid type including the ROM area and the RAM area, as shown in FIG. 35, for example, in order to carry out management of the ROM area which has been already written and cannot be erased provided within the data area, data RRD relating to the ROM area of the data area of management data of the data area management area are caused to be used (already used) state from the beginning. In addition, in order not to erroneously erase data RRD relating to the ROM area of the data area of data of the root directory area, attribute of data RRD relating to the ROM area of the data area is designated as read-out only.

Figure 36:
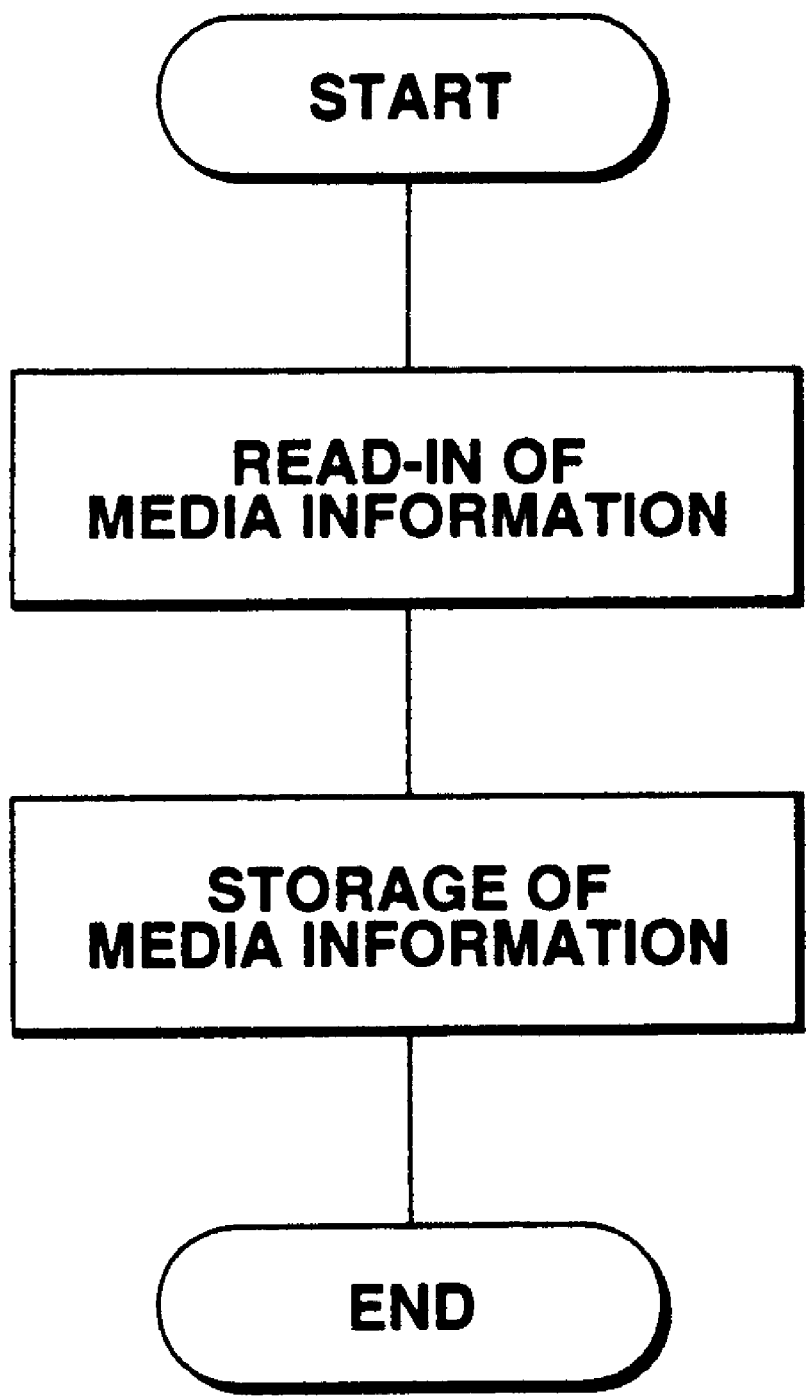
FIG. 36 is a flowchart showing the operation at the starting time of the optical disc drive apparatus.

As shown in FIG. 36, the controller 101 is operative so that every time the optical disc is loaded or power is turned ON, it reads media information indicating media kind or format, or defect information, etc. from the control track or the GCP area of the optical disc 201 to form a data table necessary for disc management within the memory.

Figure 37:
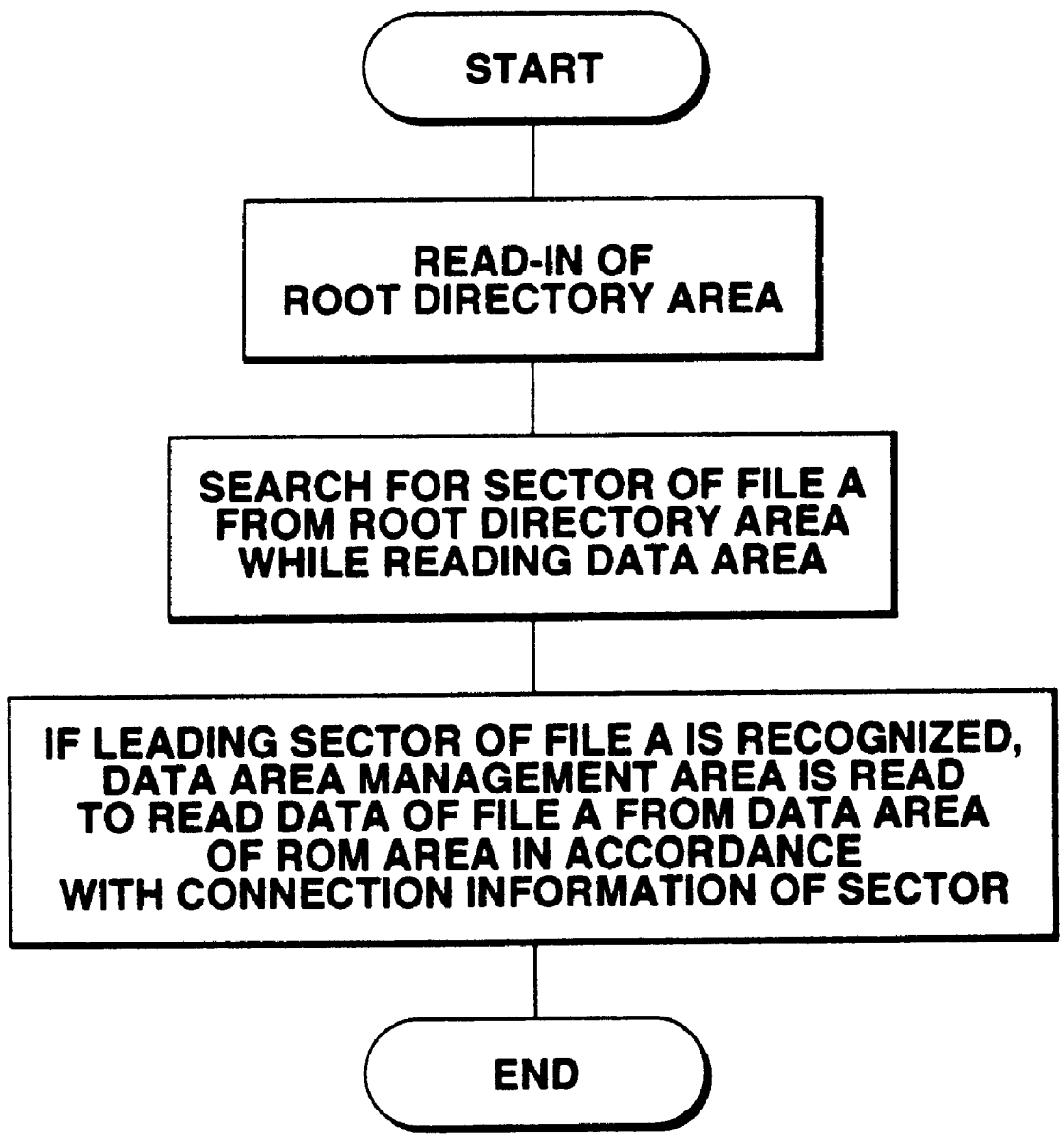
FIG. 37 is a view showing algorithm for reading file A of ROM area.

In the case where, e.g., file A of the ROM area is read, an approach is employed as shown in FIG. 37 to first read the root directory area to search for a sector of file A while reading the data area on the basis of file information of the root directory. If the leading sector of the file A is recognized, the data area management area is read to read data of the file A from the ROM area in accordance with connection information of the sector.

Figure 38:
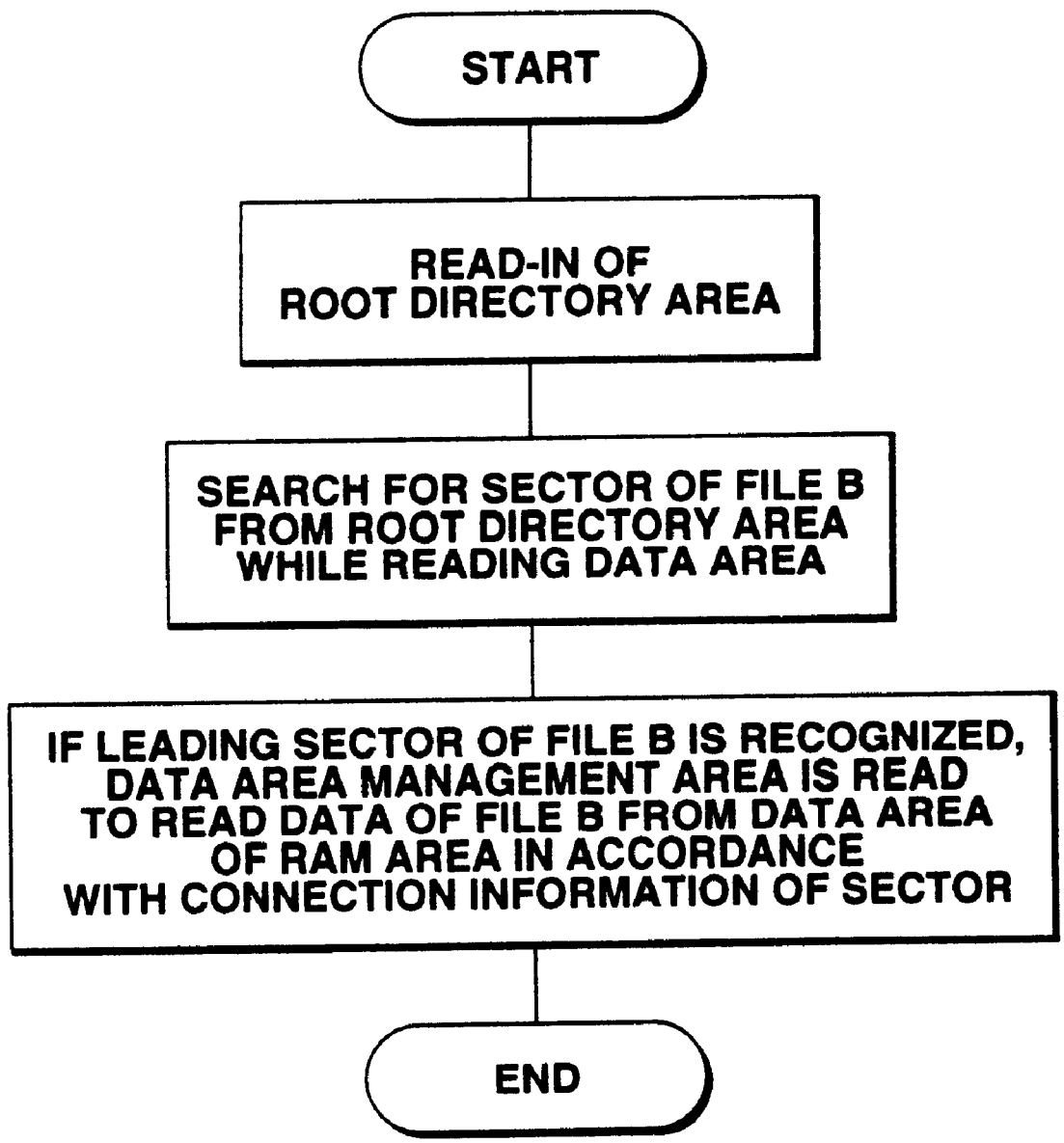
FIG. 38 is a view showing algorithm for reading file B of RAM area.

Moreover, in the case where file B of the RAM area is read, an approach is employed as shown in FIG. 38 to first read root directory area to search for a sector of file B while reading the data area on the basis of file information of the root directory. If the leading sector of the file B is recognized, the data area management area is read to read data of the file A from the RAM area in accordance with connection information of the sector.

Figure 39:
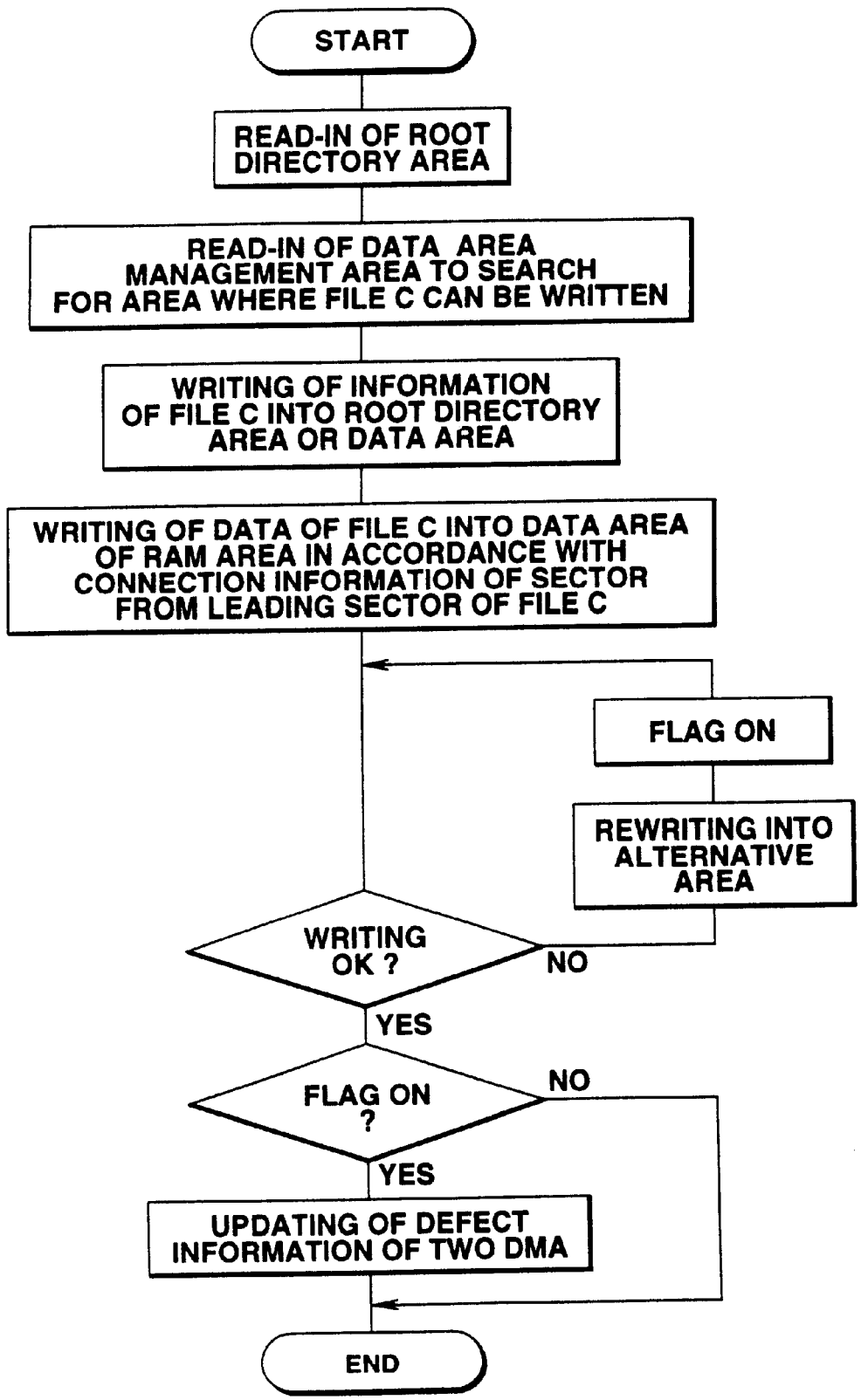
FIG. 39 is a view showing algorithm for writing file C into the RAM area.

Further, in the case where file C is written into the RAM area, an approach is employed as shown in FIG. 39 to first read the root directory area to read the data area management area to search for the area where the file C can be written. Then, information of the file C is written into the root directory area or the data area. Then, connection information of plural sectors written in the file C is written into the data area management area. Thereafter, data of the file C is written from the leading sector of the file C into the RAM area in accordance with the connection information of the sector. Then, whether or not writing of data is normally carried out is judged. As a result, in the case where judgment result is NO, i.e., writing is not normally carried out, data is rewritten into the alternative area to raise (set) alternative flag to judge for a second time whether or not writing of data is normally carried out. In the case where the judgement result is YES, i.e., writing is normally carried out, judgment as to whether or not alternative flag is raised is carried out. As a result, when no alternative flag is raised, write-in processing is completed as it is. In contrast, when the alternative flag is raised, defect information of the respective defect management areas are updated thereafter to complete the write-in processing.

The controller 101 carries out the above-described address conversion in order to provide an access to the target area in carrying out such a disc access.

Figure 40:
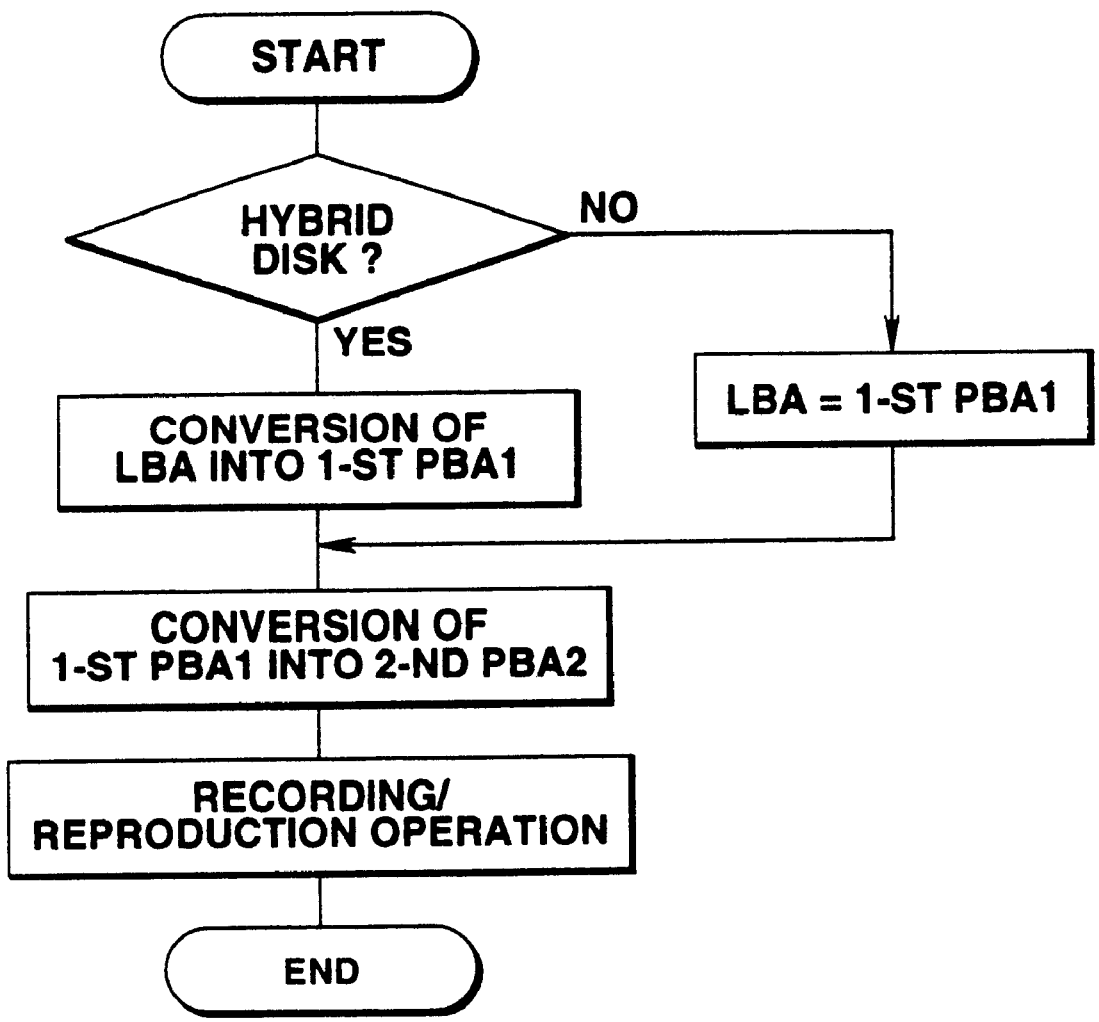
FIG. 40 is a flowchart showing recording/reproduction operation in the optical disc drive apparatus.
Figure 41:
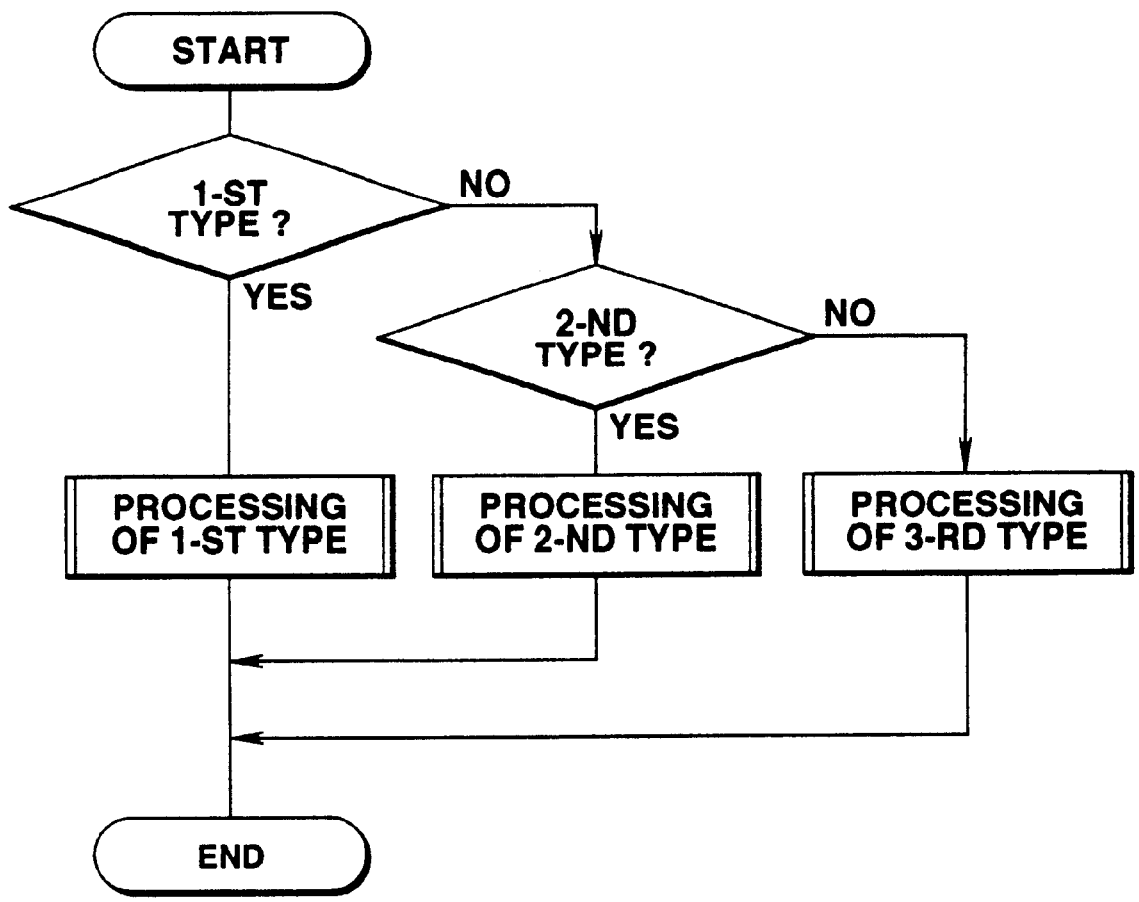
FIG. 41 is a flowchart showing a more practical example of address conversion processing in the optical disc drive apparatus.

Namely, when there is a recording or reproduction request from the host computer, the controller 101 first judges, in accordance with the flowchart shown in FIG. 40, whether or not the corresponding disc is the optical disc of the hybrid type. In the case of the optical disc of the hybrid type, request logical block address LBA is converted into first physical block address PBA1 by the conversion table. In the case of optical discs except for the optical disc of the hybrid type, the request logical block address LBA is caused to be first physical block address PBA1. Then, the first physical block address is converted into the second physical block address PBA2. Thereafter, the second physical block address PBA2 is used to provide an access to the target sector to carry out recording/reproduction.

A more practical example of processing for converting the request logical block address LBA into the first physical block address PBA1 will now be described.

Namely, in the case of carrying out the processing for converting the request logical block address LBA into the first physical block address PBA1, the controller 101 judges, in accordance with the flowchart shown in FIG. 40, what type of the optical discs of the media type including the ROM area and the RAM area allocated to the user zone is to carry out conversion processing corresponding to the first to third types. It is to be noted that in the case where the media type is designated in advance, it is unnecessary to judge the media type.

Figure 42A:
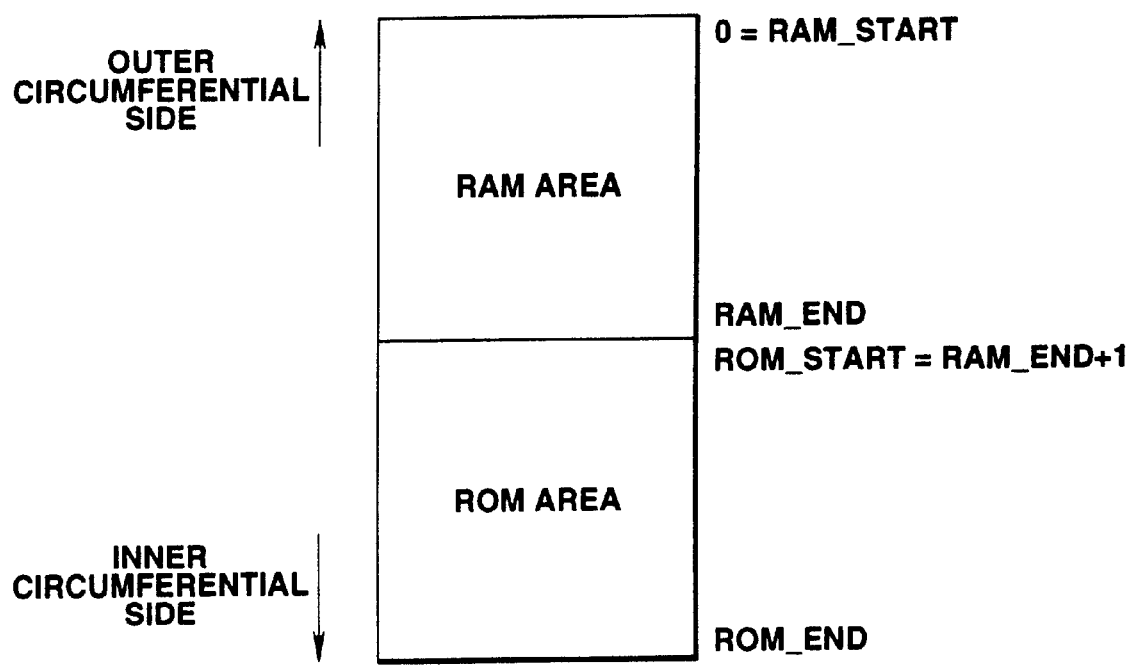
FIGS. 42A and 42B are flowcharts showing the processing content of address conversion of the first type with respect to optical disc in which RAM area is disposed (allocated) at the outer circumferential side and ROM area is disposed (allocated) at the inner circumferential side.
Figure 42B:
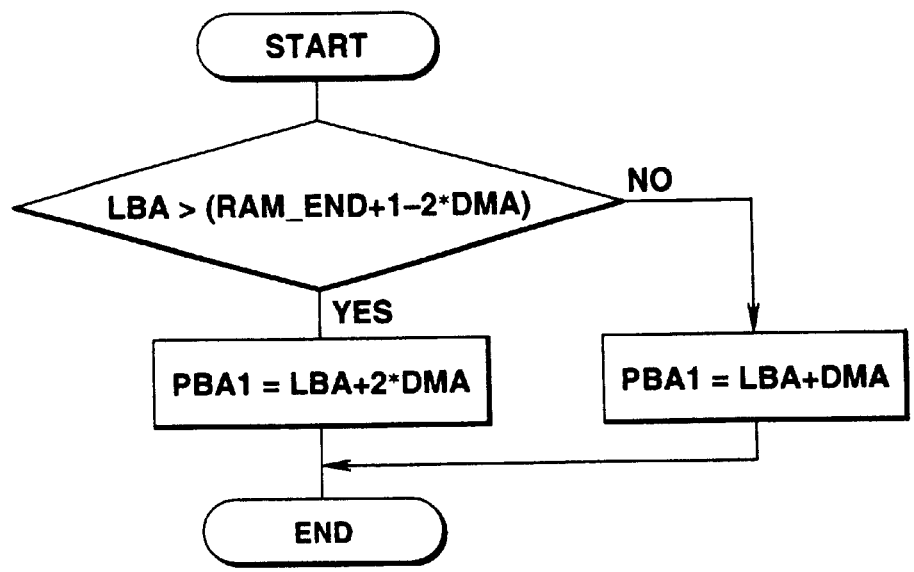

The first type of the conversion processing is conversion processing with respect to the optical disc in which the RAM area is disposed (allocated) at the outer circumferential side and the ROM area is disposed (allocated) at the inner circumferential side as shown in FIG. 42A, for example. In the first type of the conversion processing, as shown in the flowchart of FIG. 42B, at the first physical block address PBA1 on the disc, the start address of the RAM area is assumed (expressed) as RAM_START and the end address thereof is assumed (expressed) as RAM_END; and the start address of the ROM area is assumed (expressed) as ROM-START and the end address thereof is assumed (expressed), as ROM_END. With respect to the request logical address LBA from the host computer, judgment processing as expressed below is carried out:

$$LBA > (ROM\_END - 1 + 2*DMA)$$

In the case where the judgment result is YES, i.e., access to the ROM area is provided, the following formulation relating to the physical block address is employed $$PBA1 = LBA + 2*DMA$$

to calculate the first physical block address PBA1. On the other hand, in the case where the judgment result is NO, i.e., access to the RAM area is provided, the following formulation relating to the physical block address is employed $$PBA1 = LBA + DMA$$

to calculate the first physical block address PBA1.

In this example, DMA indicates size of one defect management area.

Figure 43A:
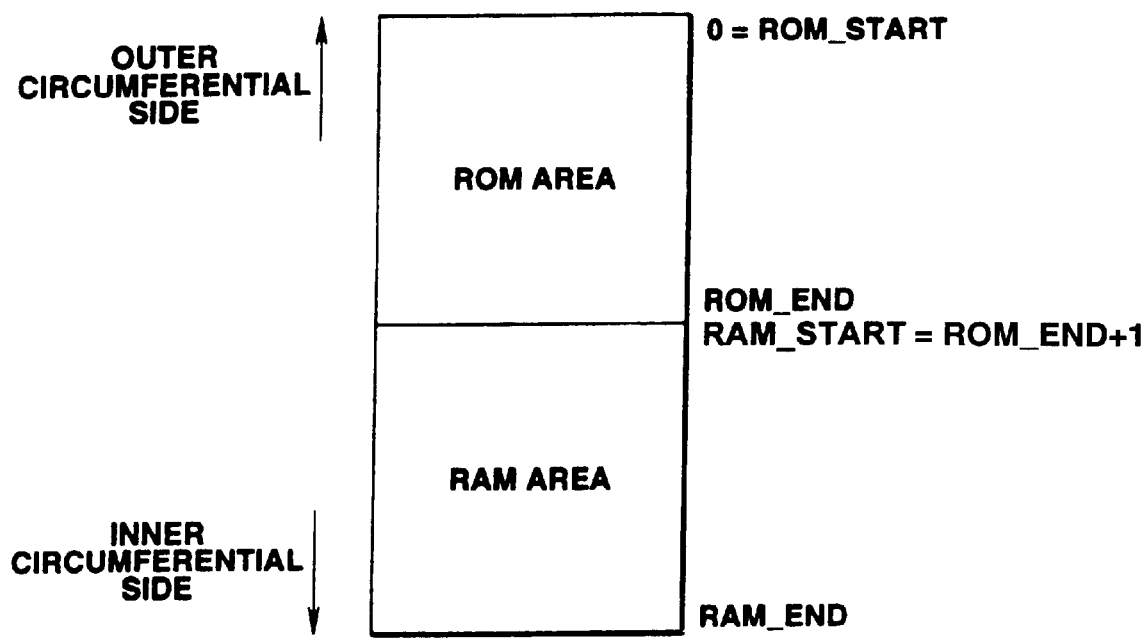
FIGS. 43A and 43B are flowcharts showing the content of address conversion processing of the second type with respect to optical disc in which ROM area is disposed (allocated) at the outer circumferential side and RAM area is disposed (allocated) at the inner circumferential side.
Figure 43B:
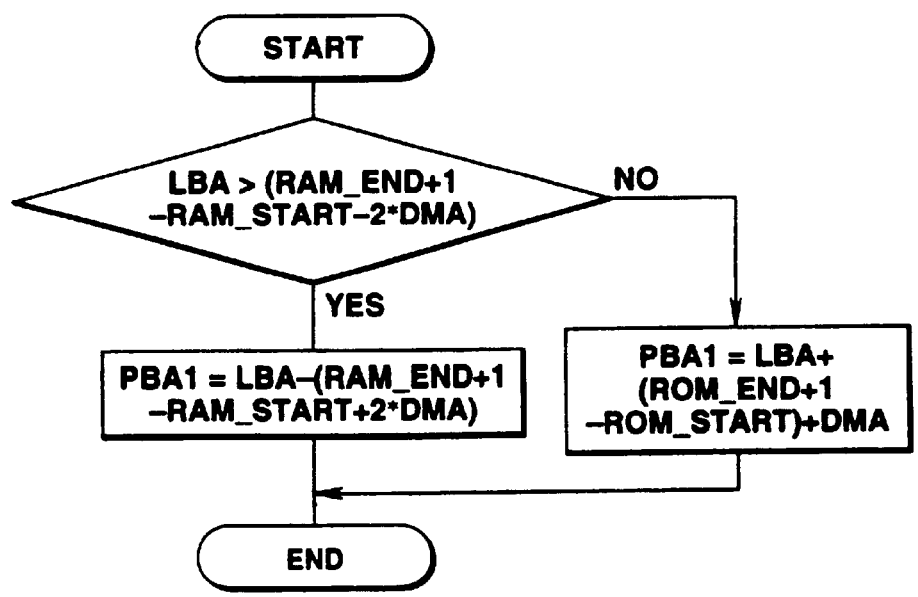

On the contrary, the second type of conversion processing is the conversion processing with respect to the optical disc in which the ROM area is disposed (allocated) at the outer circumferential side and the RAM area is disposed (allocated) at the inner circumferential side as shown in FIG. 43A, for example. In the second type of the conversion processing, as shown in the flowchart of FIG. 43B, with respect to request logical address LBA from the host computer, judgment processing as described below is carried out.

$$LBA > (RAM\_END + 1 - RAM\_START - 2*DMA)$$

In the case where the judgment result is YES, i.e., access to the ROM area is provided, the following formulation relating to the physical block address is employed $$PBAL=LBA-(RAM\_END+1-RAM\_START-2*DMA)$$

to calculate the physical track address and the physical segment address within the above-described zone. On the other hand, in the case where the judgment result is NO, i.e., access to the RAM area is provided, the following formulation relating to the physical block address is employed.

$$PBAL=LBA+(ROM\_END+1-ROM\_START)+DMA$$

to calculate the first physical block address PBA1.

Figure 44A:
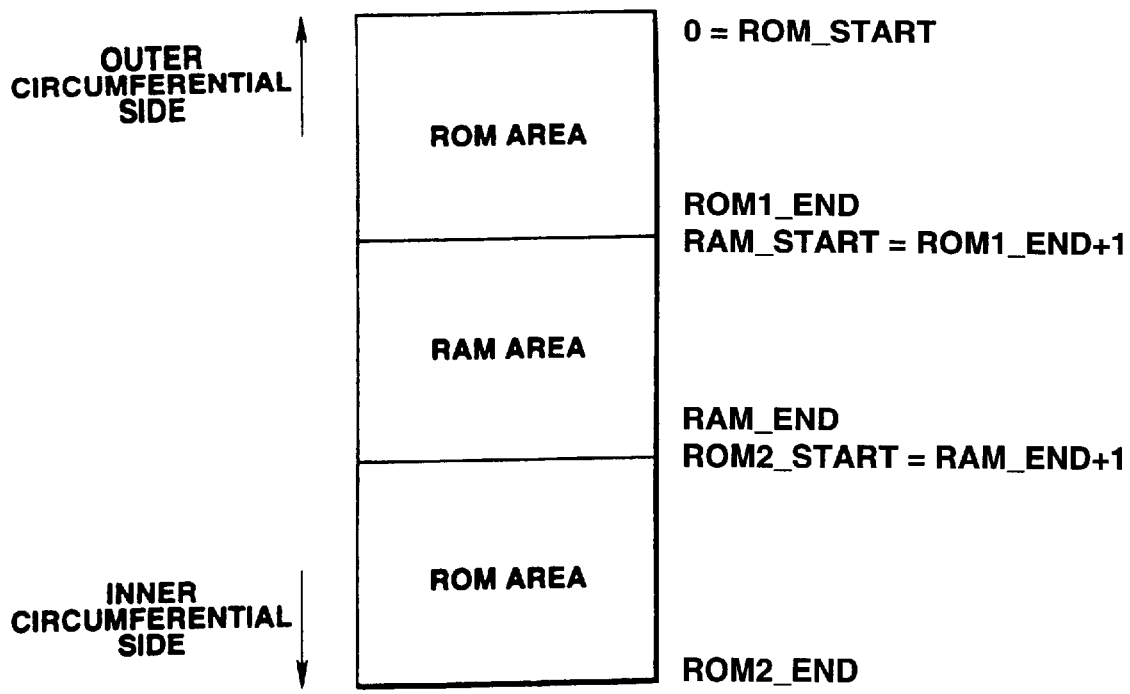
FIGS. 44A and 44B are flowcharts showing the content of address conversion processing of the third type with respect to optical disc in which ROM areas are disposed at the outer circumferential side and the inner circumferential side and RAM area at the central portion at the inner circumferential side.
Figure 44B:
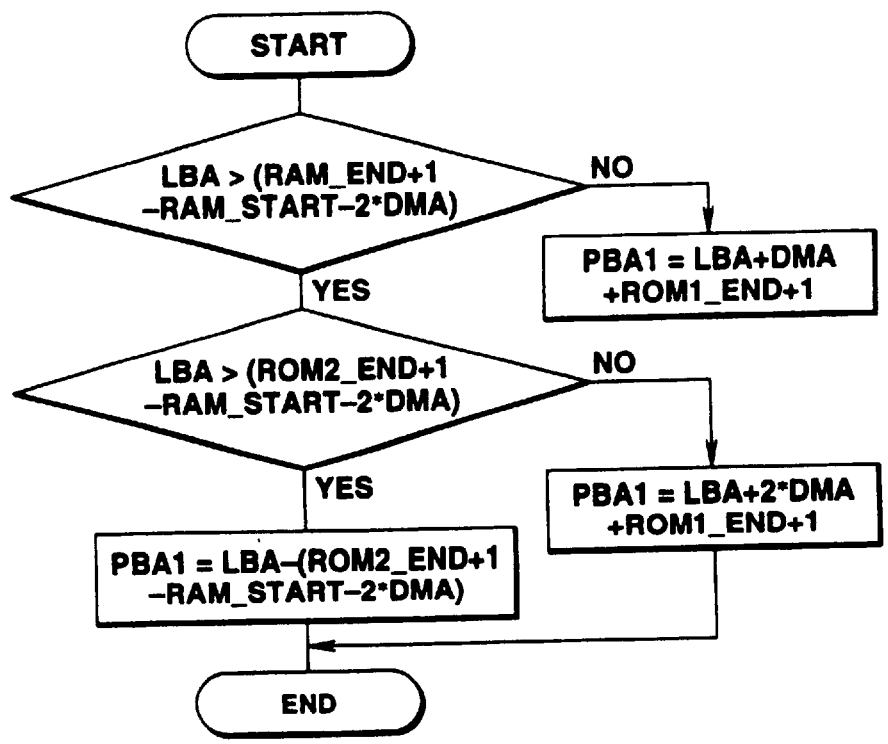

In addition, the third type of conversion processing is the conversion processing with respect to the optical disc in which the user zone is divided into three areas as shown in FIG. 44, for example, so that the ROM areas are disposed at the outer circumferential side and the inner circumferential side and the RAM area is disposed at the central portion. In the third type of conversion processing, as shown in the flowchart of FIG. 44B, at the first physical block address PBA1, the start address of the ROM area of the outer circumferential side is assumed (expressed) as ROM1_START, the end address thereof is assumed (expressed) as ROM1_END; the start address of the ROM area of the inner circumferential side is assumed (expressed) as ROM2_START and the end address thereof is ROM2_END; and the start address of the RAM area is assumed (expressed) as RAM_START and the end address thereof is assumed (expressed) as RAM_END. With respect to the request logical block address LBA from the host computer, judgment process as described below is carried out:

$$LBA>(RAM\_END+1-RAM\_START-2*DMA)$$

In the case where the judgment result is NO, i.e., access to the ROM area of the outer circumferential side is provided, the following formulation relating to the physical block address is employed $$PBAL=LBA+DMA+ROM1\_END+1$$

to calculate the first physical block address PBA1. On the other hand, in the case where the judgment result is YES, i.e., access to the RAM area or the ROM area of the inner circumferential side is provided, with respect to the request logical address LBA, the following formulation relating to the physical block address is further employed $$LBA>(ROM2-END+1-RAM\_START-2*DMA).$$

In the case where the judgment result is YES, i.e., access to the ROM area of the inner circumferential side is provided, the following formulation relating to the physical block address is employed $$PBAL=LBA-(ROM2\_END+1-RAM\_START-2*DMA)$$

to calculate the first physical block address PBA1. On the other hand, in the case where the judgment result is NO, i.e., access to the RAM area is provided, the following formulation relating to the physical block address is employed, $$PBA1=LBA+2*DMA+ROM1\_END+1$$

to calculate the first physical block address PBA1.

In addition, in converting the first physical block address PBA1 into the second physical block address PBA2, conversion processing in which alternative area corresponding to defect area is taken into consideration is carried out.

By carrying out address conversion so that logical block address LBA=0 is caused to correspond to the leading portion of the RAM area in a manner as stated above, it is possible to start reproduction from the leading portion of the RAM area disposed at the inner circumferential side. For this reason, even if the ROM area is disposed at the outer circumferential side, the optical disc thus constituted can be used as boot device. Moreover, since the ROM area can be disposed at the outer circumferential side, data transfer speed of the ROM area can be high data transfer speed in the optical disc employing the zone CAV system.

In addition, in the case of the above-mentioned optical disc including plural RAM areas as shown in FIG. 30C, for example, since the defect management areas are respectively provided immediately before the RAM area positioned at the outermost circumferential side and immediately after the RAM area positioned at the innermost circumferential side, the distance between these two defect management area can be shortened. Thus, the seek time in writing DMA information extending over the two defect management areas is reduced, thus permitting the access speed to be high.

It should be noted that while it has been described in the above-mentioned embodiments that the disc-shaped recording medium according to this invention is applied to the magneto-optical disc, this invention can be applied to other disc-shaped recording media, e.g., write once disc or magnetic disc in addition to the above-mentioned magneto-optical disc. In addition, it is a matter of course that various changes or modifications may be made within the range which does not depart from the technical idea according to this invention.

What is claimed is:

1. A disc-shaped recording medium drive apparatus adapted for driving a disc-shaped recording medium in which the medium is circumferentially divided into at least two areas including a recordable area and a reproduction only area, the recordable area and the reproduction only area having a first address, the apparatus comprising:

an address input for inputting one of the first address and a second address;

a converter for converting the first address into the second address, wherein the recordable area is positioned after the reproduction only area, and a location of the second address in an initial mode of operation of the apparatus is caused to correspond to the first address, wherein the first address corresponds to a leading portion of the recordable area; and access means for accessing information on the disc-shaped recording medium, wherein the pick-up is moved based on the first address.

2. A disc-shaped recording medium drive apparatus as set forth in claim 1, further comprising medium kind detecting means for detecting the kind of the disc-shaped recording medium, wherein the converter converts the first address into the second address by a conversion table determined based a detection result of the medium kind detecting means.

3. A disc-shaped recording medium drive apparatus as set forth in claim 1, further comprising medium discrimination means for discriminating between a reproduction only disc-shaped recording medium, a re-recordable disc-shaped recording, medium, and the disc-shaped recording medium including the recordable area and the reproduction only area, wherein the converter converts the first address into the second address only with respect to the disc-shaped recording medium including the recordable area and the reproduction only area.

4. A disc-shaped recording medium drive apparatus as set forth in claim 1,
further comprising defect detecting means for detecting a defect state of the disc-shaped recording medium,
wherein the second address is converted into a third address in which a detection result from the defect detecting means is taken into consideration to access the disc-shaped recording medium based on the third address.

5. A disc-shaped recording medium drive method for driving a disc-shaped recording medium in which the medium is circumferentially divided into at least two areas including a recordable area and a reproduction only area, the recordable area and the reproduction only area having a first address and addresses increase from one circumferential end the recording medium toward the other circumferential end in a radial direction in the respective areas the method comprising steps of:
inputting one of the first address and a second address;
converting the first address into the second address, wherein the recordable area is positioned after the reproduction only area, and a location of the second address in an initialization process is caused to correspond to the first address, wherein the first address corresponds to a leading portion the recordable area; and
accessing information on the disc-shaped recording medium by moving a pick-up based on the first address.

6. A disc-shaped recording medium drive method as set forth in claim 5,
further comprising a step of detecting the kind of the disc-shaped recording medium,
wherein, the step of converting the first address into the second address is based on a detection result at the step of detecting the kind of the disc-shaped recording medium.

7. A disc-shaped recording medium drive method as set forth in claim 5,
further comprising a step of detecting a defect state of the disc-shaped recording medium,
wherein, at the step of accessing the disc-shaped recording medium, the second address is converted into a third address in which the defect state is taken into consideration to access the disc-shaped recording medium on the basis of the third address.

8. The method of claim 5, further comprising the step of:
discriminating between a reproduction only disc-shaped recording medium, a re-recordable disc-shaped recording medium, and the disc-shaped recording medium including the recordable area and the reproduction only area,
wherein the step of converting the first address into the second address is performed only with respect to the disc-shaped recording medium including the recordable area and the reproduction only area.

9. The method of claim 5, further comprising the steps of:
detecting a defect state of the disc-shaped recording medium;
converting the second address into a third address when a defect of the disc-shaped recording medium is detected; and
accessing the disc-shaped recording medium based on the third address.

10. A disc-shaped recording medium comprising:
a recording and reproducing surface circumferentially divided into at least two areas including a recordable area and a reproduction only area,
wherein addresses increase from the outer circumferential side toward the inner circumferential side of the recording and reproducing surface in each of the recording and reproduction only areas, and
wherein addresses successively increase from an outer circumferential side of the recordable area which is positioned at the outermost portion of the outer circumferential side,
a disc management area including one or more of a boot area, a data area management area, and a root directory area.

11. A disc-shaped recording medium as set forth in claim 10, further comprising defect information recording areas for recording defect information indicating defect position within the medium respectively provided at the outer circumferential side of a first recordable area which is positioned at the outermost portion of the outer circumferential side and the inner circumferential side of a second recordable area which is positioned at the innermost portion of the inner circumferential side, wherein the recordable area comprises first and second recordable areas.

12. A disc-shaped recording medium as set forth in claim 11, wherein the recording medium is a disc-shaped recording medium for a CAV (Constant Angular Velocity) system, and the reproduction only area is formed at the outermost portion of the outer circumferential side.

13. A disc-shaped recording medium as set forth in claim 11, wherein the reproduction only areas and the recordable areas are sequentially designated in user zones.

14. A disc-shaped recording medium comprising:
a recording and reproducing surface circumferentially divided into at least two areas including a recordable area and a reproduction only area,
wherein addresses increase from the inner circumferential side toward the outer circumferential side of the recording and reproducing surface in each of the recording and reproduction only areas, and
wherein addresses successively increase from an outer circumferential side of the recordable area which is positioned at the outermost portion of the outer circumferential side.

15. A disc-shaped recording medium as set forth in claim 14, further comprising:
defect information recording areas for recording defect information indicating defect position within the medium respectively provided at the outer circumferential side of a first recordable area, which is positioned at the innermost portion of the inner circumferential side, and the inner circumferential side of a second recordable area which is positioned at the outermost portion of the outer circumferential side.

16. A disc-shaped recording Medium as set forth in claim 14,
wherein the recording medium is a disc-shaped recording medium for a zone CAV (Constant Angular Velocity) system, and the reproduction only area is formed at the outermost circumferential side.

17. A disc-shaped recording medium as set forth in claim 14,
wherein the reproduction only area and the recordable area areas are sequentially designated in user zones.

18. A disc-shaped recording medium comprising:
a recording and reproducing surface circumferentially divided into at least two areas including a recordable area and a reproduction only area; and
defect information recording areas for recording defect information indicating defect position within the medium respectively provided at the outer circumferential side of a first recordable area which is positioned at the outermost portion of the outer circumferential side and the inner circumferential side of a second recordable area which is positioned at the innermost portion of the inner circumferential side.

19. A disc-shaped recording medium as set forth in claim 18, wherein the reproduction only area and the recordable area are sequentially designated in user zones.

* * * * *